(12) United States Patent
Kuwazoe

(10) Patent No.: US 7,003,328 B2
(45) Date of Patent: Feb. 21, 2006

(54) DISPLAY SYSTEM OF A MOBILE TERMINAL APPARATUS, A DISPLAY CONTROL PROGRAM FOR SUCH DISPLAY SYSTEM, AND A DISPLAY CONTROL PROGRAM STORAGE MEDIUM

(75) Inventor: Yasuyoshi Kuwazoe, Chiba (JP)

(73) Assignee: Sony Corporation, Tokyo (JP)

( * ) Notice: Subject to any disclaimer, the term of this patent is extended or adjusted under 35 U.S.C. 154(b) by 480 days.

(21) Appl. No.: 10/358,965

(22) Filed: Feb. 3, 2003

(65) Prior Publication Data

US 2003/0153363 A1   Aug. 14, 2003

(30) Foreign Application Priority Data

Feb. 12, 2002   (JP)   ............................ P2002-034419

(51) Int. Cl.
*H04B 1/38*   (2006.01)
(52) U.S. Cl. .................. 455/566; 455/557; 345/1.1
(58) Field of Classification Search ................ 455/566, 455/557, 575.1, 412.2, 418; 345/5, 1.1, 108, 345/903, 905
See application file for complete search history.

(56) References Cited

U.S. PATENT DOCUMENTS

| | | | |
|---|---|---|---|
| 6,327,482 B1 * | 12/2001 | Miyashita | 455/566 |
| 6,640,113 B1 * | 10/2003 | Shim et al. | 455/566 |
| 6,718,182 B1 * | 4/2004 | Kung | 455/556.1 |
| 2001/0034249 A1 * | 10/2001 | Peuhu et al. | 455/566 |
| 2002/0090980 A1 * | 7/2002 | Wilcox et al. | 455/566 |
| 2002/0094845 A1 * | 7/2002 | Inasaka | 455/566 |
| 2002/0106993 A1 * | 8/2002 | Shealtiel | 455/74.1 |
| 2002/0155864 A1 * | 10/2002 | Wang | 455/566 |
| 2003/0104840 A1 * | 6/2003 | O'Hare et al. | 455/566 |
| 2003/0109286 A1 * | 6/2003 | Hack et al. | 455/566 |
| 2004/0219882 A1 * | 11/2004 | Laitinen et al. | 455/41.2 |

* cited by examiner

*Primary Examiner*—Edward F. Urban
*Assistant Examiner*—Blane J. Jackson
(74) *Attorney, Agent, or Firm*—Jay H. Maioli

(57) ABSTRACT

A mobile telephone includes an expansion slot to which an expansion display unit is attached by insertion in a way as to be capable of being taken out and put in freely. The expansion display unit is provided with an expansion display section having a display surface larger than that of the main body display section of the mobile telephone. The mobile telephone then displays information on the expansion display section. The large display surface of the expansion display section can display most of the contents of the information to be displayed collectively, which makes it easy to confirm the contents of the information to be displayed and improves the usability of the mobile telephone.

13 Claims, 15 Drawing Sheets

DISPLAY SYSTEM OF A MOBILE TERMINAL APPARATUS, A DISPLAY CONTROL PROGRAM FOR SUCH DISPLAY SYSTEM, AND A DISPLAY CONTROL PROGRAM STORAGE MEDIUM

CROSS REFERENCE TO RELATED APPLICATIONS

This application claims priority from Japanese Priority Document No. P2002-034419, filed on Feb. 12, 2002 with the Japanese Patent Office, which document is hereby incorporated by reference.

BACKGROUND OF THE INVENTION

1. Field of the Invention

The present invention relates to a mobile terminal apparatus, a display control program and a display control program storage medium to be applied to a mobile terminal apparatus. Particularly, the present invention is suitable for applying to, for example, a display system of a mobile telephone.

2. Description of Related Art

Recently, a mobile telephone has had a send/receive function of an E-mail (electronic mail), and a function for making it possible to use the Internet in addition to a telephonic function. Moreover, the mobile telephone has been made to be able to display on its display section various pieces of information to be displayed such as a text of E-mail sent from an opponent, an image obtained among images externally stored in a server in the Internet (hereinafter, referred to as a web image), and the like.

However, in the mobile telephone having such configuration as described above, the display section has also become smaller in size together with its housing recently along with the tendency of miniaturization thereof.

Consequently, such mobile telephone can display only a very small part of the contents of information to be displayed on its display section, and sometimes it was impossible for a user to easily confirm the displayed contents of the information. Therefore, the conventional mobile telephone has a problem of poor usability in its display system.

SUMMARY OF THE INVENTION

The present invention was made in consideration of the situation described above, and proposes a display system of a mobile terminal apparatus, a display control program for such display system, and a display control program storage medium in order to be able to greatly improve the usability of the mobile terminal apparatus.

For solving such problem as described above, one aspect of the present invention is a mobile terminal apparatus that includes: a main body display section having a main body display surface formed in a predetermined size; connection means designed for attaching an external device such as a memory, or a communication connector, for example, by insertion thereto in a state capable of being freely taken out and put in, and for connecting an expansion display section thereto detachably in place of the external device or the communication connector, the expansion display section having an expansion display surface larger than the main body display surface; and display control means for making the main body display section display information to be displayed before the expansion display section is attached by insertion into the connection means, and for making the expansion display section display the information to be displayed after the expansion display section is attached by insertion into the connection means.

Consequently, because the mobile terminal apparatus displays the information to be displayed in the expansion display section having the expansion display surface larger than the main body display surface of the main body display section, the mobile terminal apparatus can exceptionally increase the part of the contents of the information to be displayed which can be displayed collectively. Thereby, the mobile terminal apparatus is able for a user to easily confirm the contents of the information to be displayed.

Moreover, because the expansion display section attached to the connection means such as connection means designed for the external memory by insertion thereto can be removed when the mobile terminal apparatus is carried, the portability of the mobile terminal apparatus can be prevented from being damaged.

As described above, according to the present invention, the usability of the mobile terminal apparatus can thus be improved greatly.

DETAILED DESCRIPTION OF THE PREFERRED EMBODIMENTS

In the following, preferred embodiments of the present invention will be described with reference to the attached drawings.

Figure 1:
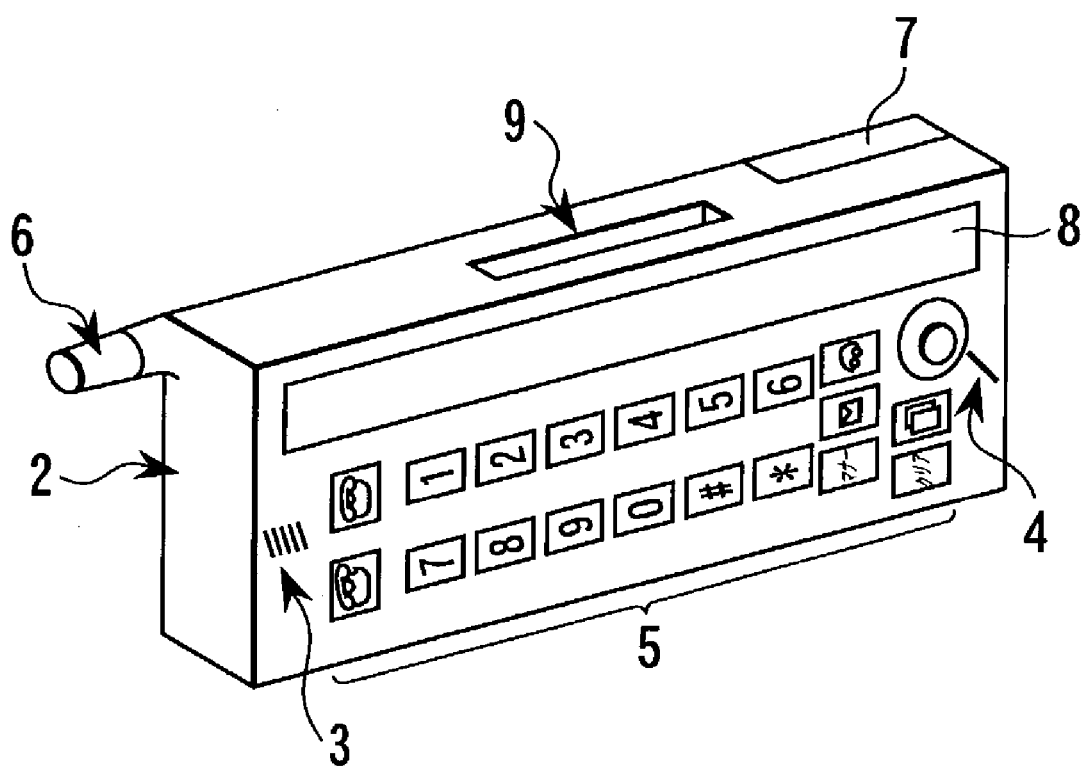
FIG. 1 is a schematic perspective view showing an embodiment of the configuration of a mobile telephone according to the present invention.

In FIG. 1, a reference numeral 1 collectively designates a mobile telephone to which the present invention is applied. A speaker 3 is provided at a front left end part of an elongated box-like main body housing 2, and voices of an opponent during telephone call or the like are output from the speaker 3.

Moreover, a microphone 4 is provided on a front right end of the main body housing 2. Voices of a user during telephone call are collected with the microphone 4.

Furthermore, an operating section 5 is provided in the front central part of the main body housing 2. The operating section 5 is composed of various operation keys such as numeric keys from "0" to "9", a calling key, a re-dial key, a clear-down and power supply key, a clear key, an E-mail key, a drive mode key, a manner button, a memo button, and the like. Various commands can be entered with these operation keys.

In addition, an antenna element 6 is provided on the left side surface of the main body housing 2 so as to be freely drawn out or housed. The mobile telephone 1 can send and receive radio waves with base stations (not shown) of a wireless communication system through the antenna element 6.

On the other hand, on the back surface of the main body housing 2, a battery pack 7 is detachably mounted. When an activation command is entered into the mobile telephone 1 through an operating section 5, an electric power is supplied to a circuit block (not shown) in the mobile telephone 1 from the battery pack 7, and the mobile telephone 1 is activated to be an operable state.

Moreover, a camera (not shown) might be provided on the back face of the main body housing 2. When an imaging command is entered into the mobile telephone 1 by means of the operating section 5, a desired object (a person, a landscape, and the like) can be photographed with the camera.

In addition to such configuration, in case of the mobile telephone 1, a liquid crystal display (hereinafter, referred to as a main body display section) 8 having a display surface shaped to be long and narrow is provided on a front upper end of the main body housing 2 in the manner in which the longer direction of the main body display section 8 is substantially parallel to the longer direction of the main body housing 2 (hereinafter, referred to as a longitudinal direction of the main body housing 2). On the main body display section 8, there are shown, as rows of character strings, various pieces of information to be displayed such as a receiving condition of a radio wave, a residual quantity of the battery, the names and the telephone numbers of opponents registered in a telephone directory, an outgoing call log, the names and the mail addresses of E-mail addresses registered in an address book, the contents of E-mail, web images, and the like.

Moreover, at the central part on the top surface of the main body housing 2, a memory stick slot (hereinafter, referred to as an expansion slot) 9 is formed in compatible with the standards of the memory stick (registered trademark owned by Sony Corporation) capable of being freely taken out and put in.

Incidentally, the memory stick is one of flash memory cards, and it has developed by Sony Corporation, the assignee of the present application. The memory stick is composed of a plastic case formed to be a small flat shape having a size of 21.5 mm in length, 50 mm in width and 0.8 mm in thickness, and a flash memory element is housed in the plastic case. The flash memory element is one of electrically erasable and programmable read only memories (EEPROM's) being non-volatile memories capable of being rewritten and erased electrically. Various data such as images, voices, music and the like can be written in and read out from the flash memory element of the memory stick through the ten-pin terminal thereof as ell-known.

Figure 2:
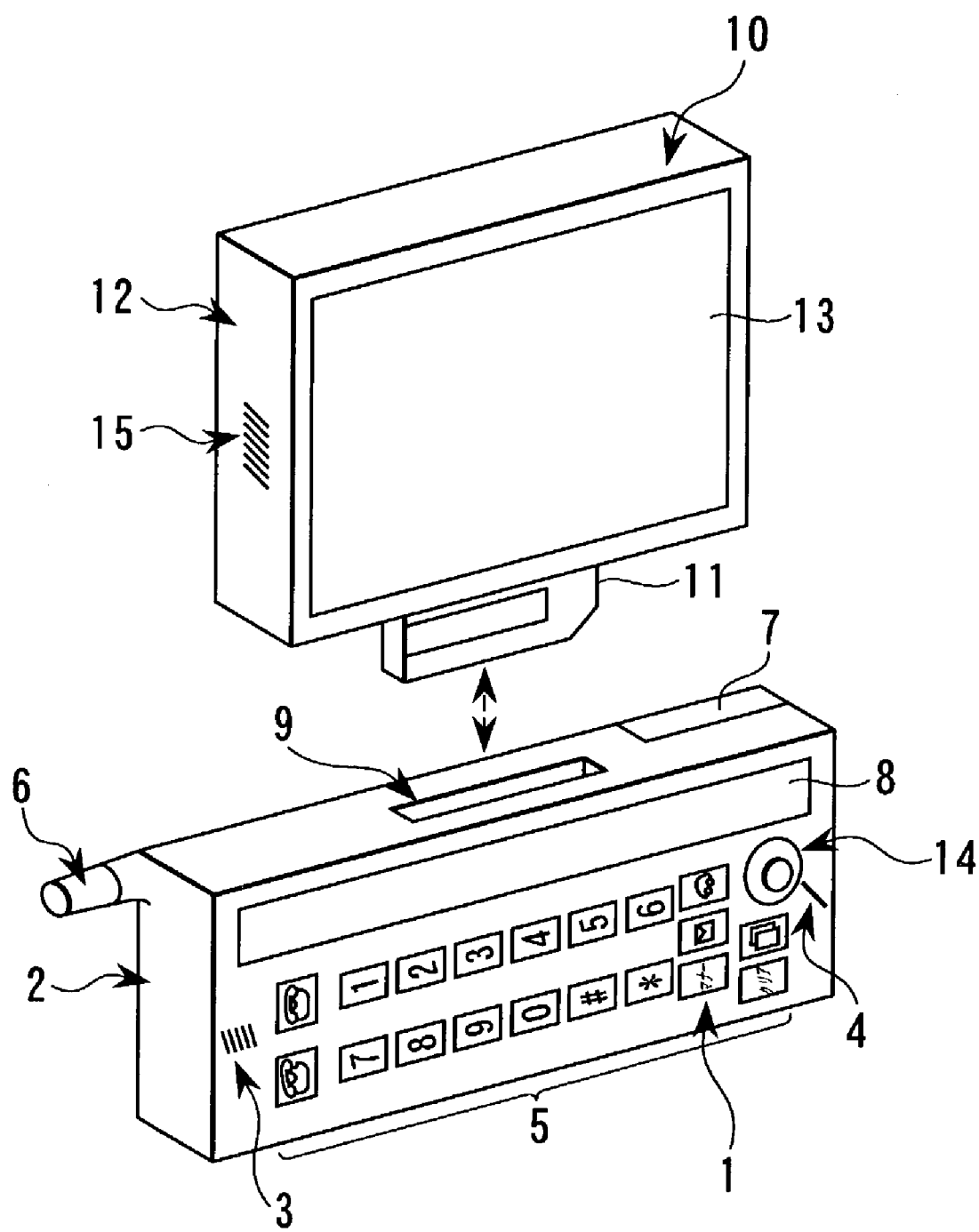
FIG. 2 is a schematic perspective view showing the mobile telephone according to the present invention before attaching an expansion display unit thereto.
Figure 3:
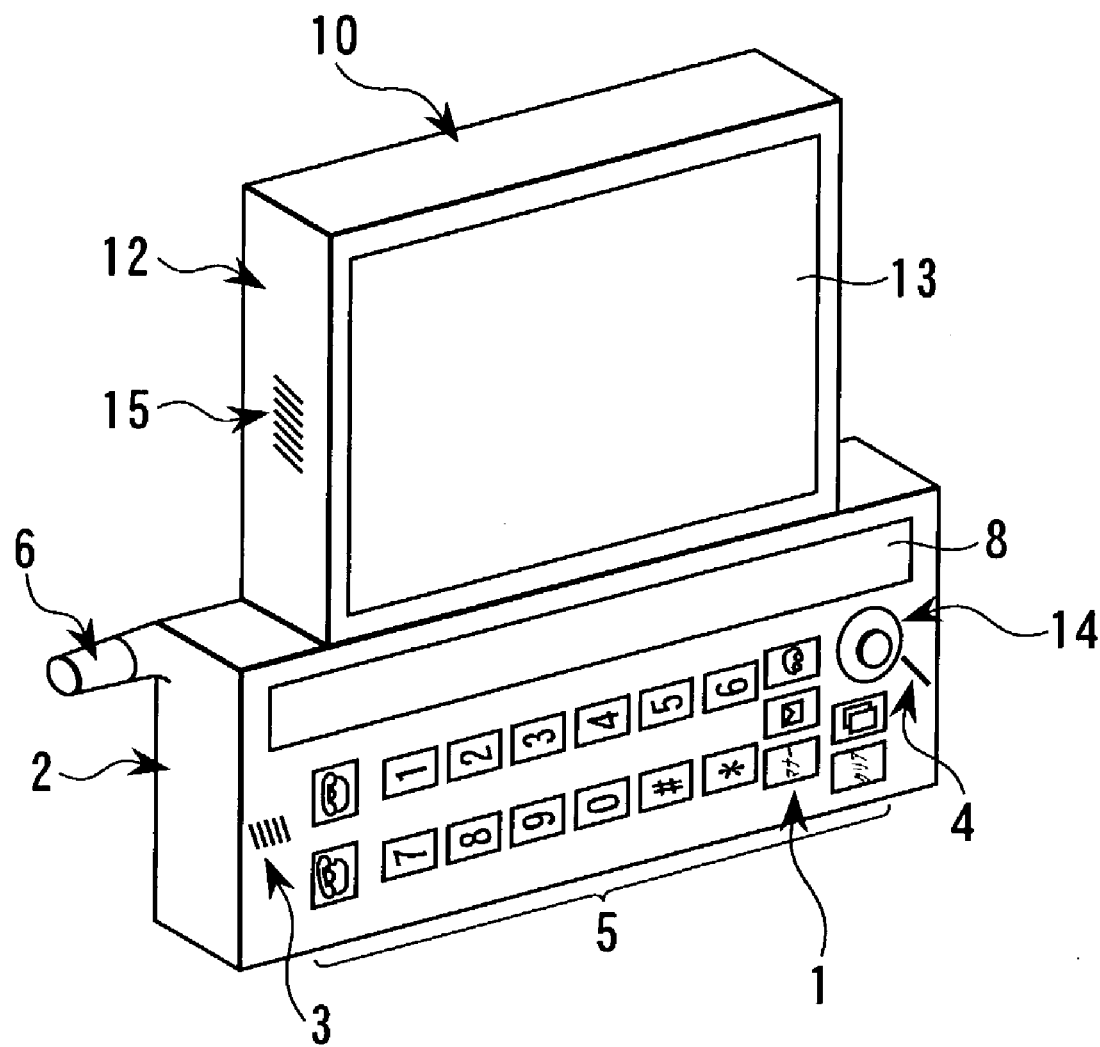
FIG. 3 is a schematic perspective view showing the mobile telephone according to the present invention after attaching the expansion display unit thereto.

As described above, the memory stick can be freely attached by insertion in the manner capable of being freely taken out and put in, and in addition, the expansion slot 9 is made to be capable of being inserted, in place of the memory stick, with an expansion stick which is provided to predetermined external equipment and meets the standards of the memory stick, or also to be capable of being inserted by an expansion stick 11 which is provided to an expansion display unit 10 and also meets the standards of the memory stick as shown in FIGS. 2 and 3 in the manner capable of being freely taken out and put in.

In this case, the expansion display unit 10 has a display unit housing 12 formed in a flat short shape having a predetermined length (the length along the longitudinal direction of the main body housing 2) shorter than that of the main body housing 2 of the mobile telephone 1, and a width wider than that of the main body housing 2. The expansion stick 11 is provided at the central part of the bottom surface of the display unit housing 12.

Moreover, on the front of the display unit housing 12, there is provided a liquid crystal display (hereinafter, referred to as an expansion display section) 13 having a display surface wider and larger than that of the main body display section 8, though the length (the length along the longitudinal direction of the main body housing 2) of the display surface of the expansion display section 13 is shorter than the display surface of the main body display section 8 of the mobile telephone 1.

Then, in the mobile telephone 1, it is made to be possible to select either of a solely displaying display mode (a sole display mode) which uses only the expansion display section 13 and a combinedly displaying display mode (a combined display mode) which uses both of the main body display section 8 and the expansion display section 13 arbitrarily in advance as the display mode of the main body display section 8 and the expansion display section 13 in the case where the expansion stick 11 of the expansion display unit 10 is attached to the expansion slot 9 by insertion.

As a matter of fact, there is the case where the information to be displayed is accompanied by associated information and the case where the information to be displayed is not accompanied by any associated information. If the expansion stick 11 of the expansion display unit 10 is attached by insertion into the expansion slot 9 in the state in which the solely displaying display mode is selected, the mobile telephone 1 stops displaying in the main body display section 8, and makes the expansion display section 13 display the information to be displayed, or the information to be displayed and the associated information therein as a plurality of rows of character strings.

Thereby, in the case where the solely displaying display mode is selected, the mobile telephone 1 can exceptionally increase a part of the contents of the information to be displayed which can collectively be displayed in the expansion display section 13 having the display surface larger than that of the main body display section 8. Consequently, the contents of various pieces of the information to be displayed can easily be confirmed by a user.

Moreover, when the expansion stick 11 of the expansion display unit 10 is attached by insertion into the expansion slot 9 in the state in which the combinedly displaying display mode is selected, the mobile telephone 1 makes the expansion display section 13 display the information to be displayed which is not accompanied by any associated information therein And, the mobile telephone 1 makes the expansion display section 13 display the information to be displayed that accompanied by the associated information therein, and makes the main body display section 8 display the associated information therein.

Thereby, the mobile telephone 1 is configured to be able to improve its visibility by displaying the information to be displayed and the associated information separately without superimposing the associated information on the information to be displayed, for example.

Moreover, in the mobile telephone 1, the main body display section 8 is located at the front top end of the main body housing 2, and the expansion display section 13 is formed over substantially the whole surface of the front of the display unit housing 12 adjacent to the front of the main body housing 2. The expansion display section 13 is arranged to be adjacent to the main body display section 8 side by side.

Thereby, the mobile telephone 1 is so configured as to make it possible to view the information to be displayed and the associated information in one united body easily with little movement of user's eyes to the utmost by regarding the expansion display section 13 and the main body display section 8 just as one display section in the case where the combinedly displaying display mode is selected, though the mobile telephone 1 makes the information to be displayed and the associated information be separately displayed in the expansion display section 13 and the main body display section 8, respectively.

Thus, the mobile telephone 1 is configured to be able to make the information to be displayed be exhibited on the comparatively large display surface of the expansion display section 13 by the attachment of the expansion stick 11 of the expansion display unit 10 by inserting into the expansion slot 9. The mobile telephone 1 can also prevent its portability from detracting by the removal of the expansion display unit 10 at the time of carrying.

Incidentally, the mobile telephone 1 is provided with an inclination and press operation key (hereinafter referred to as a jog pointer) 14 as an operation key of the operating section 5. The jog pointer protrudes from the surface of the main body housing 2 on the front of the main body housing 2. The jog pointer 14 is capable of being operated to incline in any direction within the range of 360 degrees around the center of the jog pointer 14, and is capable of being operated to be pressed in the way of being pushed into the front of the main body housing 2. In accordance with an inclination operation of the jog pointer 14, the mobile telephone 1 performs a scroll operation of a telephone directory, a list of mail addresses, the contents of E-mail, an web image and the like that are displayed on the main body display section 8 and the expansion display section 13 as the information to be displayed. The mobile telephone 1 is configured to enable for a user to select and designate a desired telephone number or a mail address in the telephone directory or the list of the mail addresses in accordance with a pressing operation of the jog pointer 14.

Moreover, on both the left and the right side faces of the display unit housing 12, there is provided an expansion speakers 15 to output music based on, for example, music data attached to a web image.

Incidentally, when the expansion stick 11 of the expansion display unit 10 is attached by insertion into the expansion slot 9, the mobile telephone 1 supplies an electric power to each circuit block in the expansion display unit 10 from the battery pack 7 through the expansion slot 9 and the expansion stick 11 in order. Thereby the mobile telephone 1 activates the whole of the expansion display unit 10.

Figure 4:
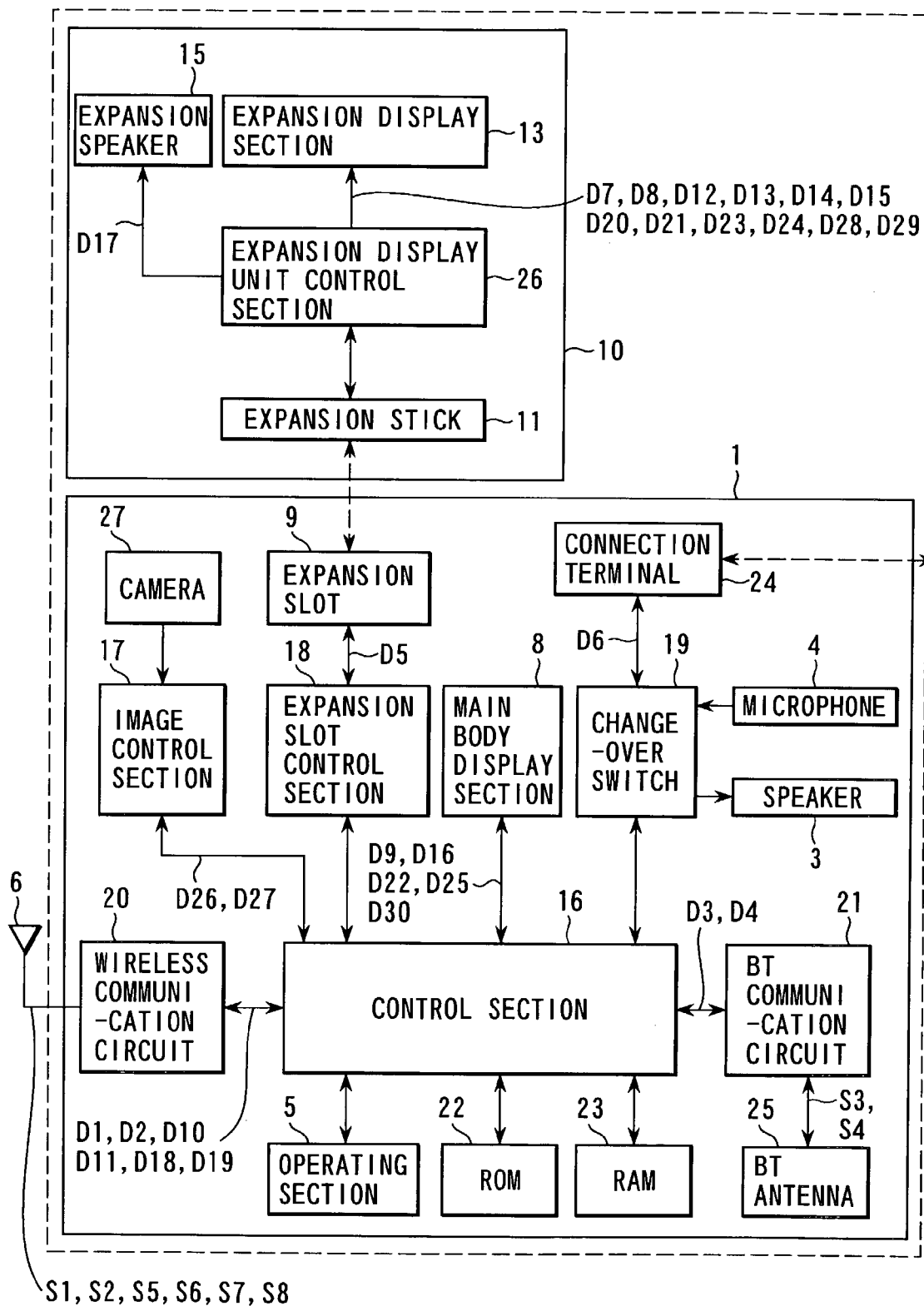
FIG. 4 is a block diagram showing a circuit configuration of the mobile telephone after attaching the expansion display unit thereto.

Here, as shown in FIG. 4, in the mobile telephone 1, a control section (hereinafter referred to as a telephone control section) 16 for controlling various functions of the mobile telephone 1 collectively is connected with an imaging control section 17, an expansion slot controlling section 18, the main body display section 8, a change-over switch 19, a wireless communication circuit 20 compatible with a wireless communication system, a communication circuit (hereinafter referred to as a BT communication circuit) 21 compatible with a Bluetooth system, an operating section 5, a read only memory (ROM) 22 storing a basic program and various application programs such as a display control program and the like therein in advance, and a random access memory (RAM) 23.

The telephone control section 16 reads out various application programs from the ROM 22 and expands the read out application programs on the RAM 23 on the basis of the various commands entered from the operating section 5 according to operations of various operation keys. Thereby, the telephone control section 16 controls the whole of the mobile telephone 1 in accordance with the various application programs.

That is, the telephone control section 16 collects the voices of a user with the microphone 4 in a telephone call mode, and takes in obtained voice data D1 through the change-over switch 19. Then, the telephone control section 16 sends the voice data D1 to the wireless communication circuit 20, and makes the wireless communication circuit 20 send a voice signal S1 obtained by performing predetermined sending processing of the voice data D1 in the wireless communication circuit 20 to a base station (not shown) of the wireless communication system through the antenna element 6.

At this time, the antenna element 6 receives a voice signal S2 of an opponent sent from the base station, and the wireless communication circuit 20 takes in the received voice signal S2 therein. The wireless communication circuit 20 performs the predetermined signal processing of the voice signal S2, and sends obtained voice data D2 to the telephone control section 16. The telephone control section 16 sends the obtained voice data D2 to the speaker 3 through the change-over switch 19. Thereby the speaker 3 outputs the voices of the opponent.

Thus, the telephone control section 16 makes a call between the user and the opponent possible in the telephone call mode.

Incidentally, when the plug (not shown) of a headset is attached by insertion into the connection terminal 24 configured as a jack in the telephone call mode, the telephone control section 16 connects itself with the connection terminal 24 in place of the speaker 3 and the microphone 4 by controlling the change-over switch 19.

Thereby the telephone control section 16 can make the call between the user and the opponent possible by the use of a microphone and a headphone, both provided on the headset.

Moreover, when a sending command of predetermined sending data D3 is supplied to the telephone control section 16 through the operating section 5 in a data sending mode using the Bluetooth, the telephone control section 16 sends the sending data D3 to the BT communication circuit 21. The BT communication circuit 21 performs a predetermined sending processing of the sending data D3, and sends an obtained sending signal S3 to other electronic equipment (not shown) compatible with the Bluetooth through an antenna element (hereinafter referred to as a BT antenna element) 25 compatible with the Bluetooth.

Then, the telephone control section 16 makes the BT communication circuit 21 take in a reception signal S4 sent from other electronic equipment compatible with the Bluetooth through the BT antenna 25 compatible with the Bluetooth in a data receiving mode using the Bluetooth, and then the BT communication circuit 21 performs a predetermined reception processing of the reception signal S4 to take in an obtained reception data D4.

In such a way, the telephone control section 16 is made to be capable of sending and receiving such various data with other electronic equipment compatible with the Bluetooth.

Incidentally, the Bluetooth is a short range wireless data communication standard standardized by the Bluetooth Special Interest Group (Bluetooth SIG) being a standardizing organization. The Bluetooth standard regulates the communication standard as follows. Channels are set to 79 each having a bandwidth of 1 MHz within an Industrial Scientific and Medical (ISM) band of 2.4 GHz, and, for example, a data transfer of about 10 m is performed with a data transfer rate of 1 Mbit/sec. (721 kbit/sec. in an effective value) by means of a spread spectrum communication method of a frequency hopping system in which channels are switched 1600 times per one second.

Now, when the memory stick (not shown) and the expansion stick 11, which are capable of being freely taken out and put into the expansion slot 9, are attached by insertion into the expansion slot 9, a detection terminal formed in the inside of the expansion slot 9 is electrically conducted. Thereby, the expansion slot controlling section 18 detects the attachment of the memory stick and the expansion stick 11.

Then, the expansion slot controlling section 18 reads out identification data D5, which are peculiar to the memory stick and the expansion display unit 10 (and external equipment) and are previously stored in the memory stick and the expansion stick 11, through the expansion slot 9, and the expansion slot controlling section 18 sends the read identification data D5 to the telephone control section 16.

Thereby, the telephone control section 16 recognizes that the thing attached to the mobile telephone 1 at the expansion slot 9 is either the memory stick or the expansion display unit 10 (and the external equipment) on the basis of the identification data D5 given from the expansion slot controlling section 18. Then, the telephone control section 16 controls the memory stick and the expansion display unit 10 (and the external equipment) according to the recognition result through the expansion slot controlling section 18 and the expansion slot 9 in order.

Practically, when the telephone control section 16 receives a reproduction command from the operating section 5 in the state in which the memory stick is attached to the expansion slot 9 by insertion therein, the telephone control section 16 reproduces, for example, music data D6 stored in the memory stick from the memory stick, and takes in the music data D6 through the expansion slot 9 and the expansion slot control section 18 in order. Then, the telephone control section 16 sends the music data D6 to the headphone of the headset through the change-over switch 19, the connection terminal 24 and the plug of the headset, and thereby the telephone control section 16 is configured to be able to make music sound based on the music data D6 out from the headphone.

On the contrary, when the expansion stick 11 of the expansion display unit 10 is attached to the expansion slot 9 by insertion therein, the telephone control section 16 executes the display control of the main body display section 8 and the expansion display section 13 according to the solely displaying display mode or the combinedly displaying display mode which are previously selected on, for example, to display a display setting screen image on the main body display section 8.

That is, if the information to be displayed is not accompanied by any associated information in the case where the solely displaying display mode has been selected in the state in which the expansion display unit 10 is attached to the telephone control section 16, the telephone control section 16 sends data of information to be displayed D7 corresponding to the information to be displayed to the expansion display section 13 through the expansion slot controlling section 18, the expansion slot 9, the expansion stick 11 and an expansion display unit control section 26 in order. Then, the telephone control section 16 makes the expansion display section 13 display the information to be displayed based on the data of information to be displayed D7 therein.

Moreover, if the information to be displayed is accompanied by some associated information in the case where the solely displaying display mode has been selected in the state in which the expansion display unit 10 is attached to the telephone control section 16, the telephone control section 16 sends display information data D8 corresponding to the information to be displayed and the associated information to the expansion display section 13 through the expansion slot controlling section 18, the expansion slot 9, the expansion stick 11 and the expansion display unit control section 26 in order. Then, the telephone control section 16 makes the expansion display section 13 display the information to be displayed and the associated information based on the display information data D8 therein.

On the contrary, if the information to be displayed is not accompanied by any associated information in the case where the combinedly displaying display mode has been selected in the state in which the expansion display unit 10 is attached to the telephone control section 16, the telephone control section 16 sends the data of the information to be displayed D7 corresponding to the information to be displayed to the expansion display section 13 through the expansion slot controlling section 18, the expansion slot 9, the expansion stick 11 and the expansion display unit control section 26 in order. Thereby, the telephone control section 16 makes the expansion display section 13 display the information to be displayed based on the data of the information to be displayed D7 therein.

Moreover, if the information to be displayed is accompanied by some associated information, the telephone control section 16 separates the associated information from the information to be displayed, and sends the data of the information to be displayed D7 corresponding to the information to be displayed to the expansion display section 13 through the expansion slot controlling section 18, the expansion slot 9, the expansion stick 11 and the expansion display unit control section 26. Thereby, the telephone control section 16 makes the expansion display section 13 display the information to be displayed based on the data of the information to be displayed D7 therein. Furthermore, the telephone control section 16 sends associated information data D9 corresponding to the associated information to the main body display section 8, and thereby makes the main body display section 8 display the associated information based on the associated information data D9 therein.

Incidentally, if the information to be displayed is not accompanies by any associated information in the state in which the expansion display unit 10 is attached though the combinedly displaying display mode has been selected, the telephone control section 16 prevents any wasteful power consumption of the battery pack 7 by stopping the power supply to the main body display section 8.

Practically, in the state in which the expansion display unit 10 is attached, the telephone control section 16 receives a web image signal S5 of a web image as the information to be displayed sent from a web server (not shown) through the Internet and the base station in order with the antenna element 6 to taken the received web image signal S5 into the wireless communication circuit 20. Then, the wireless communication circuit 20 performs the predetermined reception processing of the web image signal S5 to generate web image data D10.

Moreover, if the web image data D10 has designation of automatic acquisition of advertisement image data D11 as an advertisement image, the telephone control section 16 takes an advertisement image signal S6 from, for example, an advertisement server (not shown) to the wireless communication circuit 20 according to the designation through the Internet, the base station and the antenna element 6 in order, and the wireless communication circuit 20 performs the predetermined reception processing of the taken advertisement image signal S6 to generate advertisement image data D11.

Figure 5:
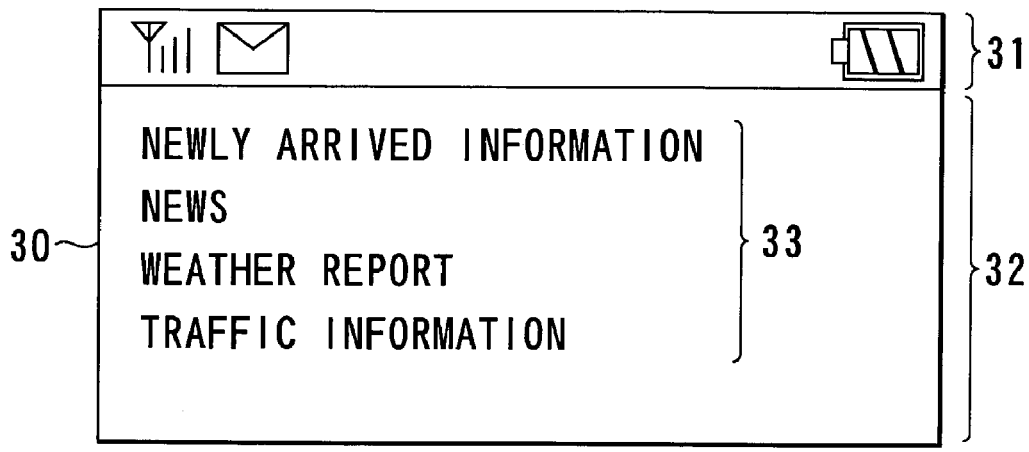
FIG. 5 is a schematic diagram showing a screen image displaying a web image in a sole display mode.

Consequently, if the telephone control section 16 obtains only the web image data D10 in the case where the solely displaying display mode has been selected in the state in which the expansion display unit 10 is attached, the telephone control section 16 uses the web image data D10 as they are to generated web image display screen data D12. Then, the telephone control section 16 sends the web image display screen data D12 to the expansion display section 13 through the expansion slot controlling section 18, the expansion slot 9, the expansion stick 11 and the expansion display unit control section 26 in order, and thereby the telephone control section 16 makes the expansion display section 13 display a web image displaying screen 30 based on the web image display screen data D12 therein as shown in FIG. 5.

The web image displaying screen 30 in the solely displaying display mode is configured to have a state display region 31 located on the upper side of the screen and a web image display region 32 located below the state display region 31.

In this case, in the web image displaying screen 30, a plurality of icons indicating various states of the mobile telephone 1 such as a receiving condition of radio waves, the existence of reception of E-mail, a battery residual quantity and the like are displayed in the state display region 31, and web images 33 based on the web image data D10 are displayed in the web image display region 32.

Figure 6:
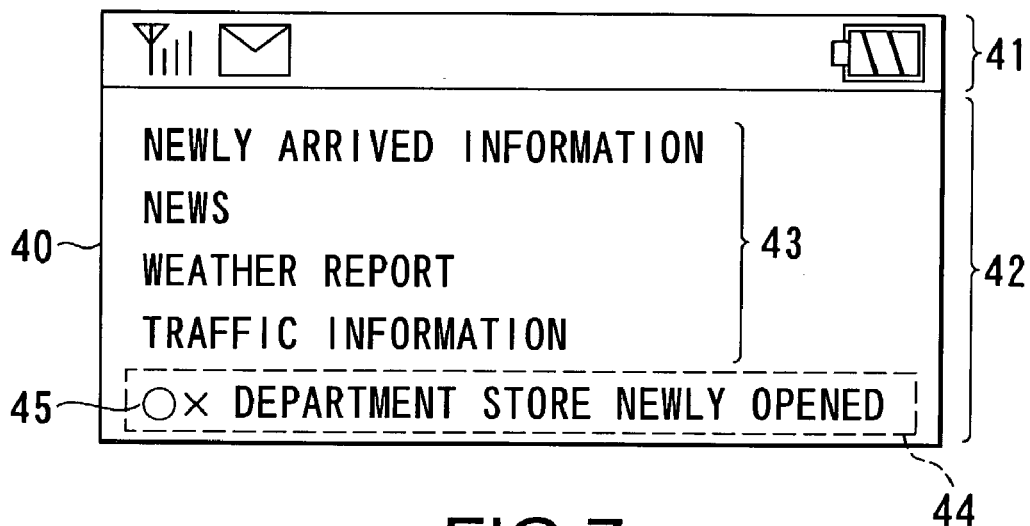
FIG. 6 is a schematic diagram showing a screen image displaying a web image including an advertisement in a sole display mode.

Moreover, if the telephone control section 16 has obtained the web image data D10 and the advertisement image data D11 in the case where the solely displaying display mode has been selected in the state in which the expansion display unit 10 is attached, the telephone control section 16 generates advertisement added web image display screen data D13 on the basis of the web image data D10 and the advertisement image data D11. And, the telephone control section 16 sends the generated advertisement added web image display screen data D13 to the expansion display section 13 through the expansion slot controlling section 18, the expansion slot 9, the expansion stick 11 and the expansion display unit control section 26 in order. Thereby, the telephone control section 16 makes the expansion display section 13 display an advertisement added web image displaying screen 40 based on the advertisement added web image display screen data D13 therein as shown in FIG. 6.

The advertisement added web image displaying screen 40 in the solely displaying display mode is configured to have a state display region 41 on the upper side of the screen and a web image display region 42 below the state display region 41.

In this case, the advertisement added web image displaying screen 40 displays a plurality of icons indicating various states of the mobile telephone 1 in the state display region 41, and displays web images 43 based on the web image data D10 in the web image display region 42 as the state display region 31 of the web image displaying screen 30 which has been described above with reference to FIG. 5. In addition, the advertisement added web image displaying screen 40 displays an advertisement image 45 based on the advertisement image data D11 in an advertisement display frame 44 provided at a lower side in the web image display region 42.

Thereby, if the telephone control section 16 has obtained the web image data D10 and the advertisement image data D11 together, the telephone control section 16 makes the advertisement added web image displaying screen 40 display the web image 43 and the advertisement image 45 therein collectively, and the telephone control section 16 enables a user to view the web image 43 and the advertisement image 45 easily in distinction from each other by means of the advertisement display frame 44.

Figure 7:
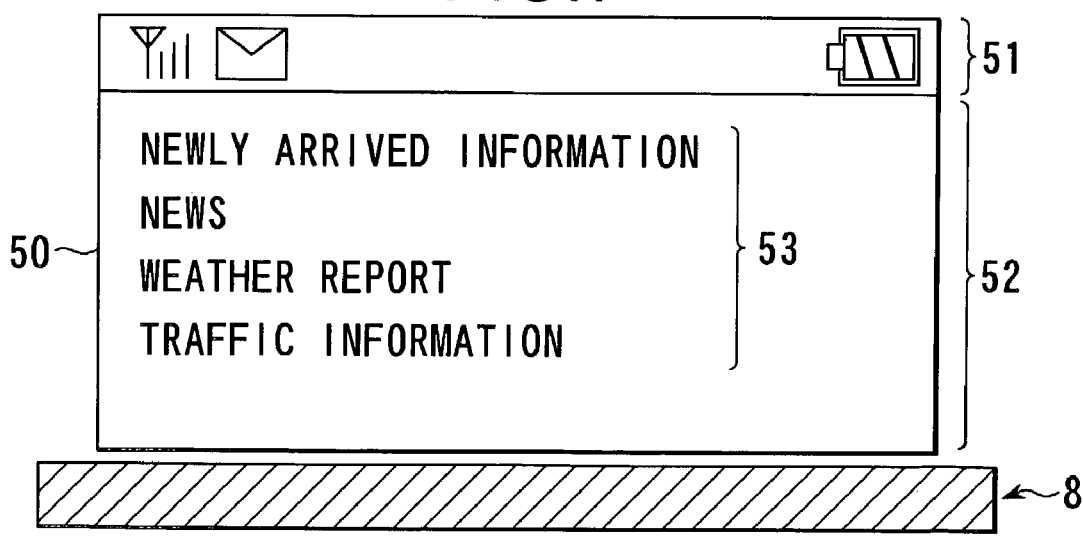
FIG. 7 is a schematic diagram showing screen images displaying web images in a combined display mode.

If the telephone control section 16 has obtained only the web image data D10 in the case where the combinedly displaying display mode has been selected in the state in which the expansion display unit 10 is attached, the telephone control section 16 generates web image display screen data D14 on the basis of the web image data D10. Then, the telephone control section 16 sends the web image display screen data D14 to the expansion display section 13 through the expansion slot controlling section 18, the expansion slot 9, the expansion stick 11 and the expansion display unit control section 26. Thereby, the telephone control section 16 makes the expansion display section 13 display a web image displaying screen 50 based on the web image display screen data D14 therein as shown in FIG. 7.

Incidentally, the telephone control section 16 makes the main body display section 8 display nothing therein to render it the state of being put out in this case.

The web image displaying screen 50 in the combinedly displaying display mode is configured to have a state display region 51 on the upper side of the screen and a web image display region 52 below the state display region 51.

In this case, in the web image displaying screen 50, a plurality of icons indicating various states of the mobile telephone 1 are displayed as in the state display region 31 of the web image displaying screen 30 which has been described above with reference to FIG. 5, and web images 53 based on the web image data D10 are displayed in the web image display region 52.

Figure 8:
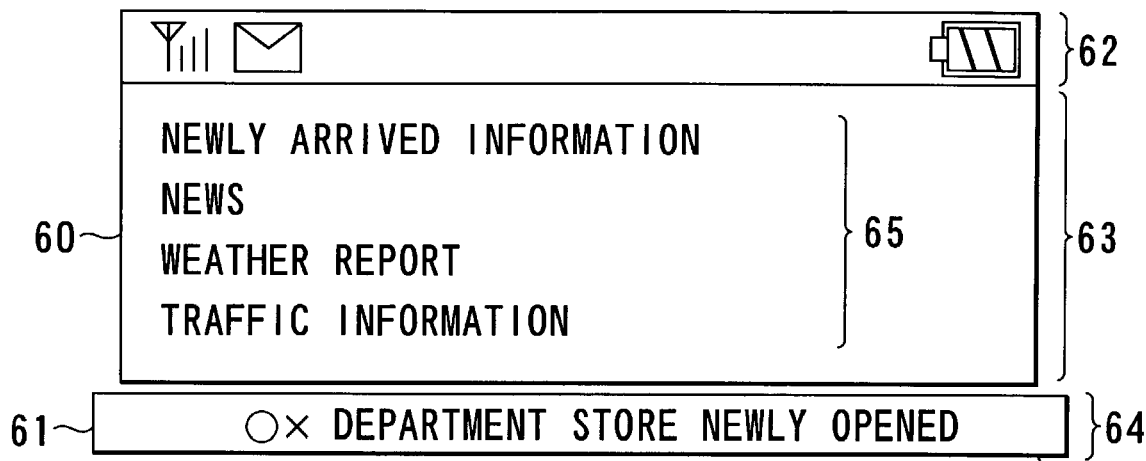
FIG. 8 is a schematic diagram showing screen images displaying a web image and an advertisement display image in a combined display mode.

Moreover, if the telephone control section 16 has obtained the web image data D10 and the advertisement image data D11 in the case where the combinedly displaying display mode has been selected in the state in which the expansion display unit 10 is attached, the telephone control section 16 generates web image display screen data D15 on the basis of the web image data D10. Then, the telephone control section 16 sends the web image display screen data D15 to the expansion display section 13 through the expansion slot controlling section 18, the expansion slot 9, the expansion stick 11 and the expansion display unit control section 26 in order. Thereby, the telephone control section 16 makes the expansion display section 13 display a web image displaying screen 60 based on the web image display screen data D15 therein as shown in FIG. 8. In addition, the telephone control section 16 generates advertisement display screen data D16 on the basis of the advertisement image data D11, and sends the generated advertisement display screen data D16 to the main body display section 8. Thereby, the telephone control section 16 makes the main body display section 8 display an advertisement displaying screen 61 based on the advertisement display screen data D16 therein as shown in FIG. 8.

The web image displaying screen 60 in the combinedly displaying display mode is configured to have a state display region 62 located on the upper side of the screen and a web image display region 63 located below the state display region 62.

In this case, in the web image displaying screen 60, a plurality of icons indicating various states of the mobile telephone 1 is displayed as in the state display region 31 of the web image displaying screen 30 which has been described above with reference to FIG. 5, and web images 65 based on web image data D10 are displayed in the web image display region 63.

Moreover, the whole of the advertisement displaying screen 61 in the combinedly displaying display mode is configured to be an advertisement image displaying region 64.

Then, an advertisement image 66 based on the advertisement image data D11 is displayed in the advertisement image displaying region 64 of the advertisement displaying screen 61.

Incidentally, when music data D17 is added to the web image data D10, the telephone control section 16 sends the music data D17 to the expansion speakers 15 through the expansion slot controlling section 18, the expansion slot 9, the expansion stick 11 and the expansion display unit control section 26 in order. Thereby, the telephone control section 16 makes the expansion speakers 15 output the music based on the music data D17 there-from.

On the other hand, when the telephone control section 16 has received a mail signal S7 sent from a mail server (not shown) through the Internet and the base station in order with the antenna element 6 in the state in which the expansion display unit 10 is attached and has taken the received mail signal into the wireless communication circuit 20, the wireless communication circuit 20 performs the predetermined reception processing of the mail signal S7 to generate incoming mail text data D18 and incoming mail information data D19.

Here, an incoming mail text based on the incoming mail text data D18 is the information to be displayed, and the mail address of a sender, the title of the incoming mail text and the like based on the incoming mail information data D19 (hereinafter referred to as incoming mail information collectively) are the associated information accompanying the incoming mail text (i.e. the information to be displayed).

Figure 9:
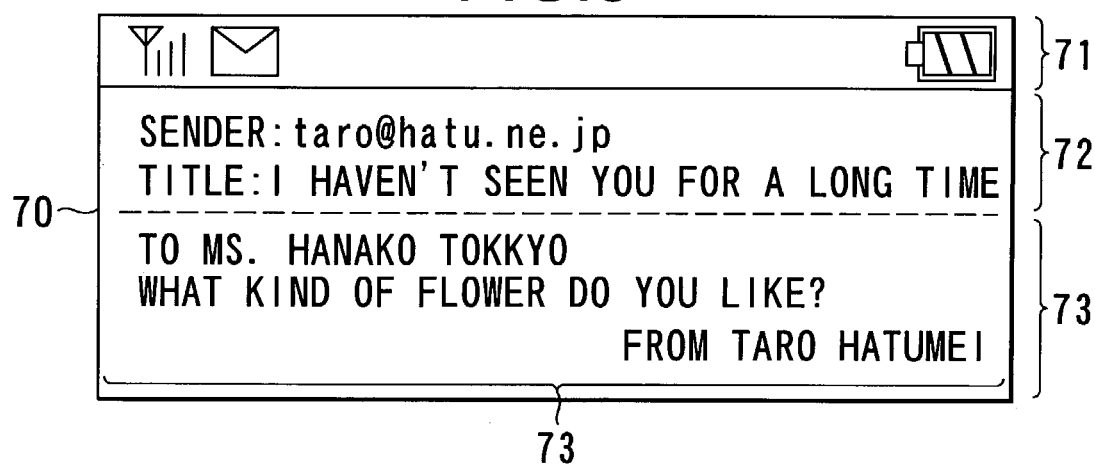
FIG. 9 is a schematic diagram showing a screen image displaying a received E-mail display image in a sole display mode.

Consequently, when the telephone control section 16 receives the mail signal S7 in the case where the solely displaying display mode has been selected in the state in which the expansion display unit 10 is attached, the telephone control section 16 generates incoming mail displaying screen data D20 on the basis of the incoming mail text data D18 and the incoming mail information data D19. Then, the telephone control section 16 sends the generated incoming mail displaying screen data D20 to the expansion display section 13 through the expansion slot control section 18, the expansion slot 9, the expansion stick 11, and the expansion display unit control section 26. Thereby, the telephone control section 16 makes the expansion display section 13 display an incoming mail displaying screen 70 based on the incoming mail displaying screen data D20 therein as shown in FIG. 9.

The incoming mail displaying screen 70 in the combinedly displaying display mode is configured to form a state display region 71, a mail information display region 72 and a mail text display region 73 over the incoming mail displaying screen 70 from the top part thereof to the bottom part thereof in order.

In this case, in the incoming mail displaying screen 70, a plurality of icons indicating various states of the mobile telephone 1 is displayed in the state display region 71 as in the state display region 31 of the web image displaying screen 30 described above with reference to FIG. 5, and incoming mail information 74 based on the incoming mail information data D19 is displayed in the mail information display region 73. Furthermore, an incoming mail text 75 based on the incoming mail text data D18 is displayed in the mail text display region 73.

Figure 10:
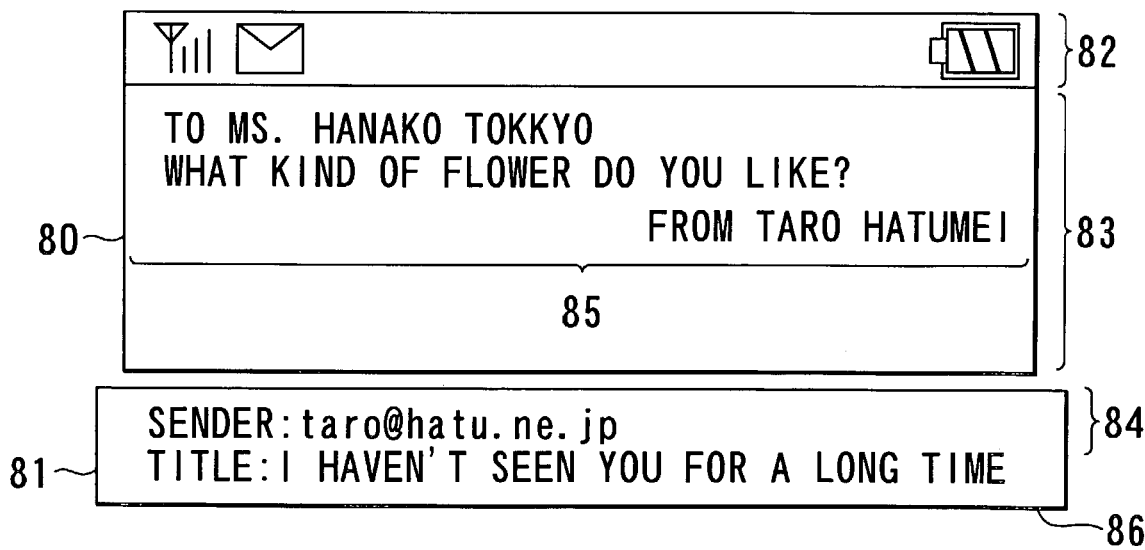
FIG. 10 is a schematic diagram showing screen images displaying a received mail text display image and the received mail information display image in a combined display mode.

Moreover, when the telephone control section 16 receives the mail signal S7 in the case where the combinedly displaying display mode has been selected in the state in which the expansion display unit 10 is attached, the telephone control section 16 generates the incoming mail text display screen data D21 on the basis of the incoming mail text data D18. And, the telephone control section 16 sends the generated incoming mail text display screen data D21 to the expansion display section 13 through the expansion slot controlling section 18, the expansion slot 9, the expansion stick 11 and the expansion display unit control section 26. Thereby, the telephone control section 16 makes the expansion display section 13 display an incoming mail text displaying screen 80 based on the incoming mail text display screen data D21 therein as shown in FIG. 10. In addition, the telephone control section 16 generates incoming mail information display screen data D22 on the basis of the incoming mail information data D16, and sends the generated incoming mail information display screen data D22 to the main body display section 8. Thereby, the telephone control section 16 makes the main body display section 8 display an incoming mail information displaying screen 81 based on the incoming mail information display screen data D22 therein as shown in FIG. 10.

The incoming mail text displaying screen 80 in the combinedly displaying display mode is configured to have a state display region 82 on the upper side of the screen and a mail text display region 83 below the state display region 82.

In this case, in the incoming mail text displaying screen 80, a plurality of icons indicating various states of the mobile telephone 1 is displayed in the state display region 82 as in the state display region 31 of the web image displaying screen 30 which has been described above with reference to FIG. 5, and an incoming mail text 85 based on the incoming mail text data D18 is displayed in the mail information display region 83.

Moreover, the whole of the incoming mail information displaying screen 81 is configured to be an incoming mail information display region 84, and incoming mail information 86 based on the incoming mail information data D19 is displayed in the mail text display region 84.

In addition to this, when an E-mail drafting command is entered into telephone control section 16 through the operating section 5 in the case where the solely displaying display mode is selected in the state in which the expansion display unit 10 is attached, the telephone control section 16 generates mail drafting screen data D23 to send the generated mail drafting screen data D23 to the expansion display section 13 through the expansion slot controlling section 18, the expansion slot 9, the expansion stick 11 and the expansion display unit control section 26 in order. Thereby, the telephone control section 16 makes the expansion display section 13 display a mail drafting screen 90 based on the mail drafting screen data D23 for displaying the information to be displayed and the associated information therein.

The mail drafting screen 90 in the solely displaying display mode is configured to arrange a state display region 91 on the upper part of the screen and a mail text display region 92 below the state display region 91.

In this case, in the mail drafting screen 90, a plurality of icons indicating various states of the mobile telephone 1 is displayed in the state display region 91 as in the state display region 31 of the web image displaying screen 30 described above with reference to FIG. 5, and in the mail text display region 92, characters of the text of E-mail for outgoing (hereinafter referred to as an outgoing mail text) drafted correspondingly to input operations of the operating section 5 are displayed.

Figure 11A:
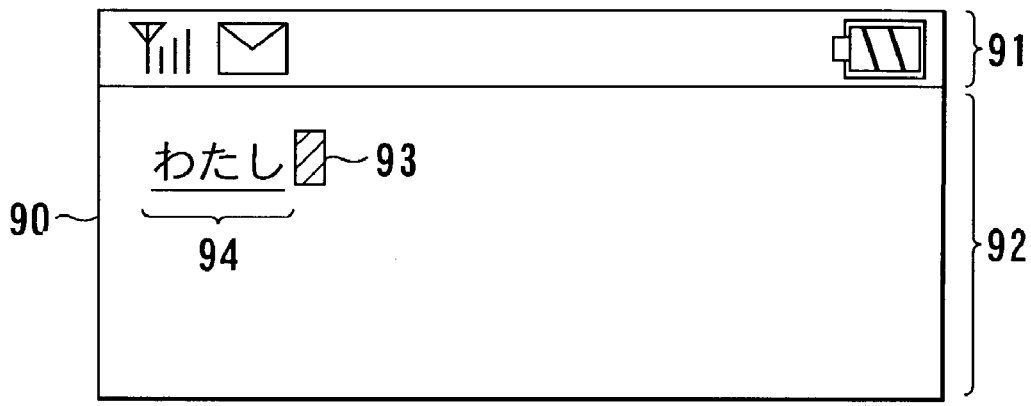
FIGS. 11A, 11B and 11C are schematic diagrams showing states of character input in a screen image displaying a display image upon drafting mail text in a sole display mode.

Practically, the telephone control section 16 makes the mail drafting screen 90 display only a cursor 93 capable of designating a display position of a character or the like in the mail text display region 92 at the beginning of drafting the outgoing mail text. In this state, when characters such as hiraganas, katakanas, kanjis (Those are Japanese characters), an alphabet, figures and the like are entered according to the operations of the operating section 5, the input characters (hereinafter referred to as input characters) 94 are displayed from the position of the cursor 93 in the mail text display region 92 of the mail drafting screen 90 as shown in FIG. 11A.

Figure 11B:
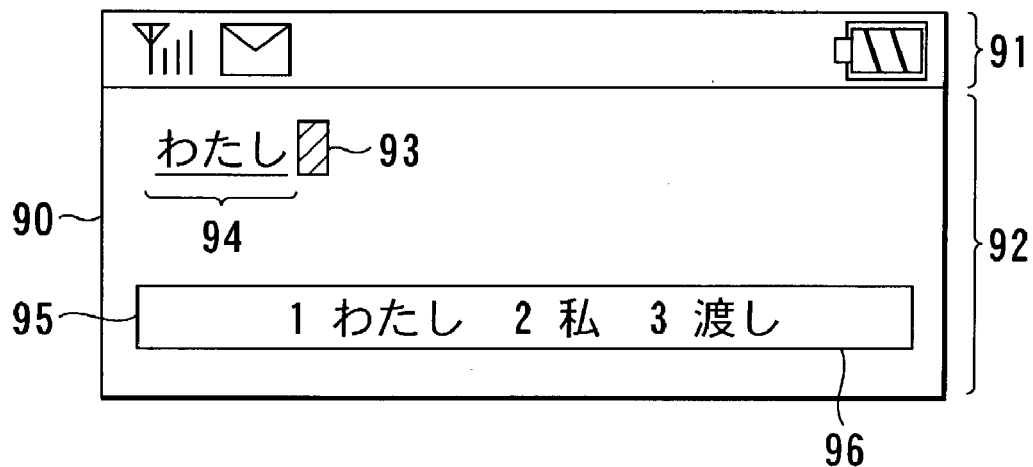

In this state, when a conversion command of the input characters 94 (also including a character string of the input characters) is entered on the mail drafting screen 90 according to operations of the operating section 5, the telephone control section 16 makes the expansion display screen 13 display a conversion candidate display frame 95 on a lower side in the mail text display region 92 in the mail drafting screen 90 as shown in FIG. 11B. In addition, the telephone control section 16 makes the expansion display screen 13 display a plurality of conversion candidate characters 96 such as katakanas, kanjis, the alphabet, figures and the like being conversion candidates of the input characters 94 in the conversion candidate display frame 95.

Figure 11C:
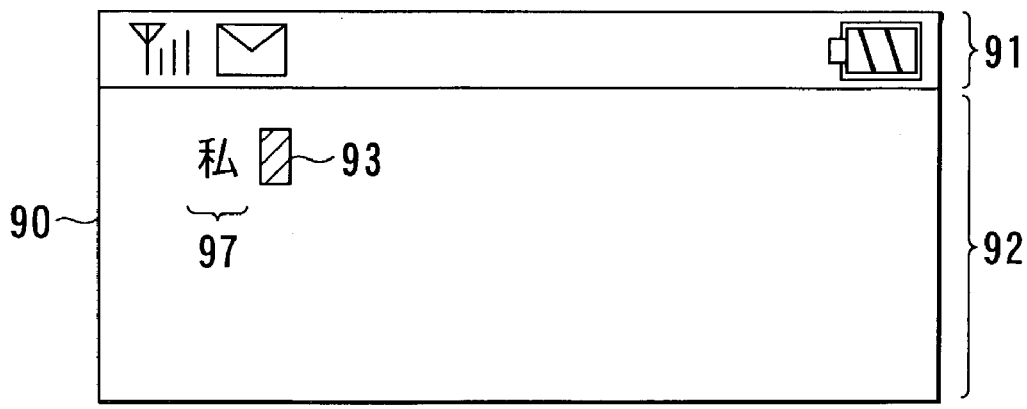

Then, when an arbitrary conversion candidate character among each of the conversion candidate characters 96 in the mail drafting screen 90 is selected according to an operation of the operating section 5, the telephone control section 16 makes the expansion display screen 13 display the selected conversion candidate character 97 by replacing the input character 94 in the mail text display region 92 in the mail drafting screen 90 with the selected conversion candidate character 97 as shown in FIG. 11C.

In such a way, the telephone control section 16 is made to be capable of drafting an outgoing mail text by displaying the input characters 94 input through the operating section 5 and the conversion candidate characters 96 selected to the input character 94 in the mail text display region 92 in the mail drafting screen 90 as shown in FIG. 11B. This conversion is called as a Kana to kanji conversion system, and is widely employed in any Japanese input system.

Figure 12A:
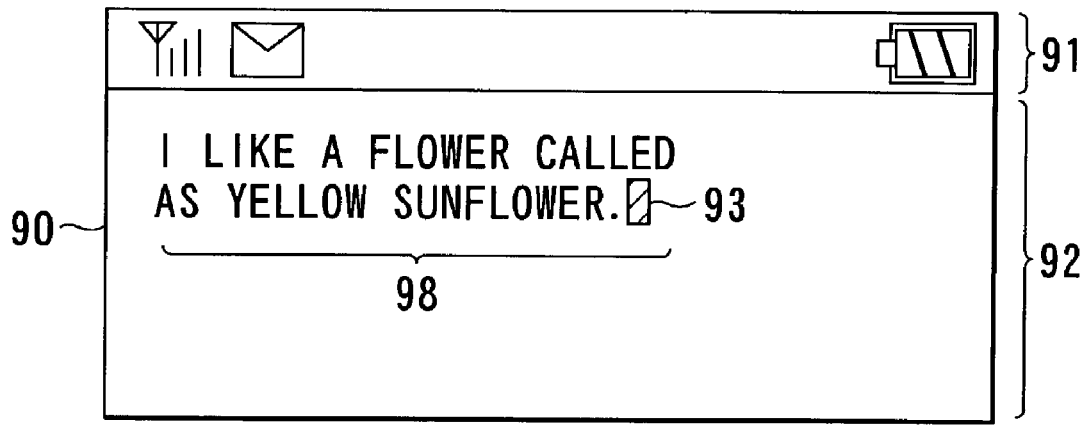
FIGS. 12A, 12B and 12C are schematic diagrams showing states of character shifting in a screen image displaying a display image upon drafting mail text in a sole display mode.
Figure 12B:
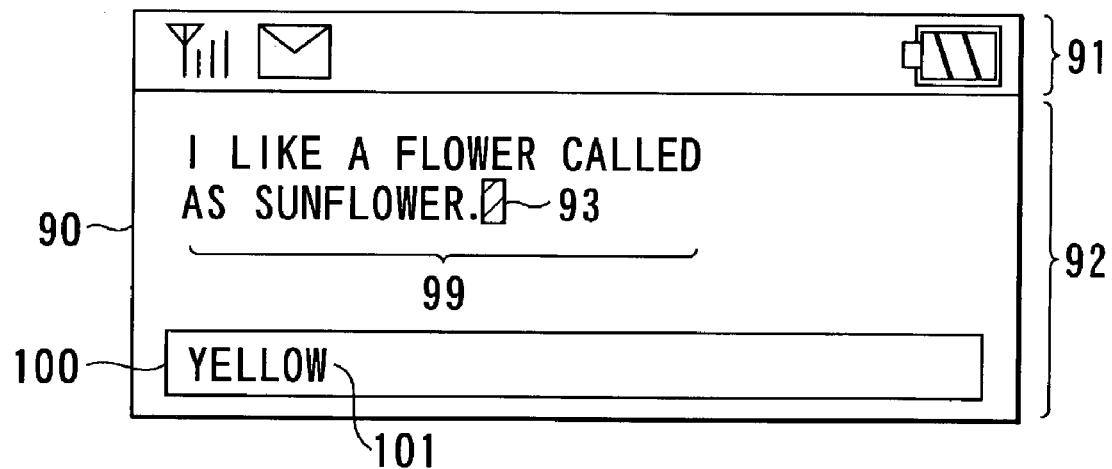

Incidentally, the telephone control section 16 moves the cursor 93 on the mail drafting screen 90 according to operations of the operating section 5. When an arbitrary character or a character string (hereinafter referred to as an insertion position alteration character) 101 is selected for altering an insertion position in the outgoing mail text 98, the telephone control section 16 makes the expansion display screen 13 display an outgoing mail text 99 except insertion position alteration characters 101 as well as the cursor 93 in the mail text display region 92 as shown in FIG. 12B. Then, the telephone control section 16 makes the expansion display screen 13 display an insertion position alteration character display frame 100 on a lower side in the mail text display region 92. In addition, the telephone control section 16 makes the expansion display screen 13 display the insertion position alteration characters 101 in the insertion position alteration character display frame 100.

Figure 12C:
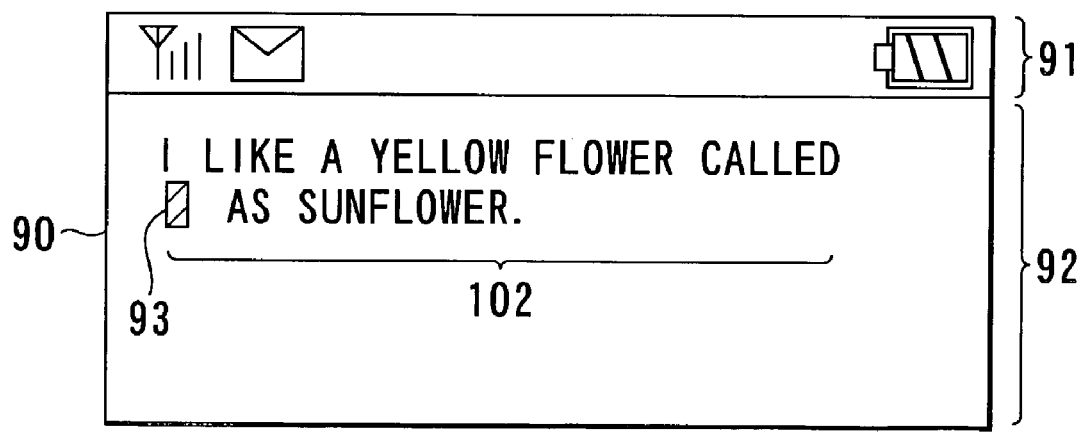

In this state, the telephone control section 16 moves the cursor 93 on the mail drafting screen 90 according to operations of the operating section 5. When an insertion position for inserting the insertion position alternating characters 101 into the outgoing mail text 99 is newly designated, the telephone control section 16 moves the insertion position alteration characters 101 in the insertion position alteration character frame 100 to the designated insertion position in the outgoing mail text 99 as shown in FIG. 12C.

In such a way, the telephone control section 16 is also made to be capable of editing an outgoing mail text while the outgoing mail text is being drafted.

Figure 13A:
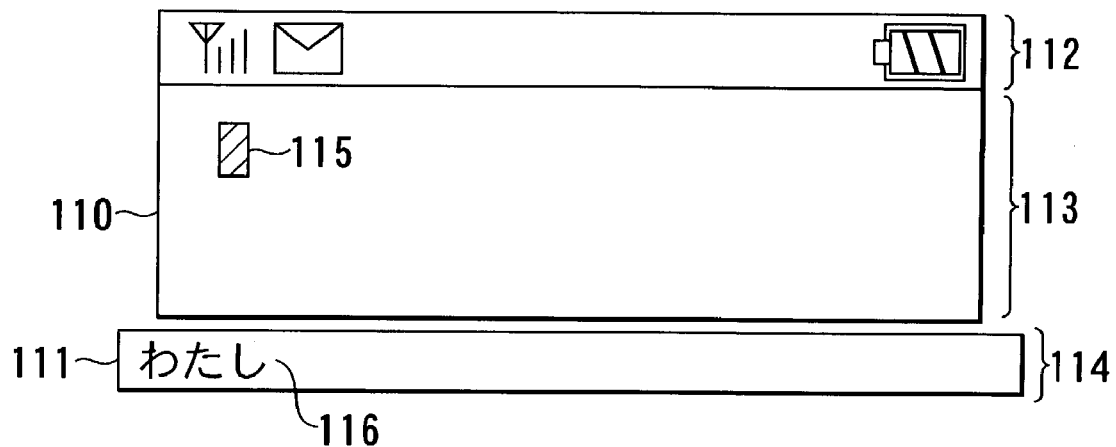
FIGS. 13A, 13B and 13C are schematic diagrams showing states of character input in screen images displaying a display image an auxiliary display image upon drafting mail text in a sole display mode.

Moreover, when an E-mail drafting command is entered into telephone control section 16 through the operating section 5 in the case where the combinedly displaying display mode has been selected in the state in which the expansion display unit 10 is attached, the telephone control section 16 generates mail drafting screen data D24 to send the generated mail drafting screen data D24 to the expansion display section 13 through the expansion slot controlling section 18, the expansion slot 9, the expansion stick 11 and the expansion display unit control section 26 in order. Thereby, the telephone control section 16 makes the expansion display section 13 display a mail drafting screen 110 based on the mail drafting screen data D24 for displaying the information to be displayed as shown in FIG. 13A. In addition, the telephone control section 16 generates auxiliary mail drafting screen data D25 to send the generated auxiliary mail drafting screen data D25 to the main body display section 8. Thereby, the telephone control section 16 makes the main body display section 8 display an auxiliary mail drafting screen 111 based on the auxiliary mail drafting screen data D25 for displaying associated information.

In this case, the mail drafting screen 110 in the combinedly displaying display mode is configured to arrange a state display region 112 and a mail text display region 113 in the mail drafting screen 110 from the upper side thereof to the lower side thereof in order. And, a plurality of icons indicating various states of the mobile telephone 1 is displayed in the state display region 112 as in the state display region 31 in the web image display screen 30 described above with reference to FIG. 5.

Moreover, the auxiliary mail drafting screen 111 is wholly configured to be an undetermined character display region 114.

Then, the telephone control section 16 makes the expansion display screen 13 display only a cursor 115 in the mail text display region 113 in the mail drafting screen 110 at the beginning of drafting an outgoing mail text. In addition, the telephone control section 16 makes the main body display section 8 display nothing in the initial state in the undetermined character display region 114 of the auxiliary mail drafting screen 111.

In this state, when input characters 116 are entered according to operations of the operating section 5, the telephone control section 16 makes the expansion display section 13 display the input characters 116 in the undetermined character display region 114 of the auxiliary mail drafting screen 111 as shown in FIG. 13A.

Figure 13B:
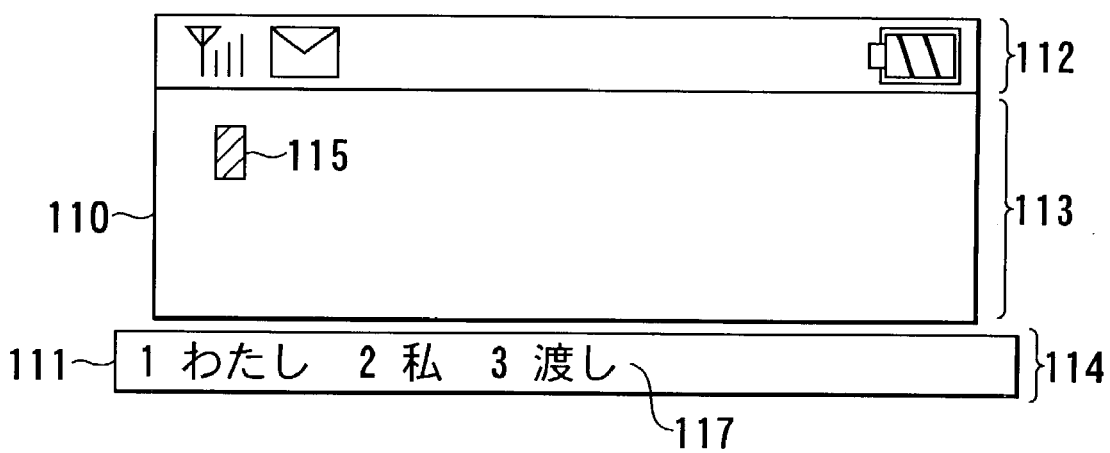

Then, when a conversion command of the input characters 116 is entered through the operating section 5, the telephone control section 16 makes the main body display section 8 display a plurality of conversion candidate characters 117 being conversion candidates of the input characters 116 in the undetermined character display region 114 of the auxiliary mail drafting screen 111 as shown in FIG. 13B.

Figure 13C:
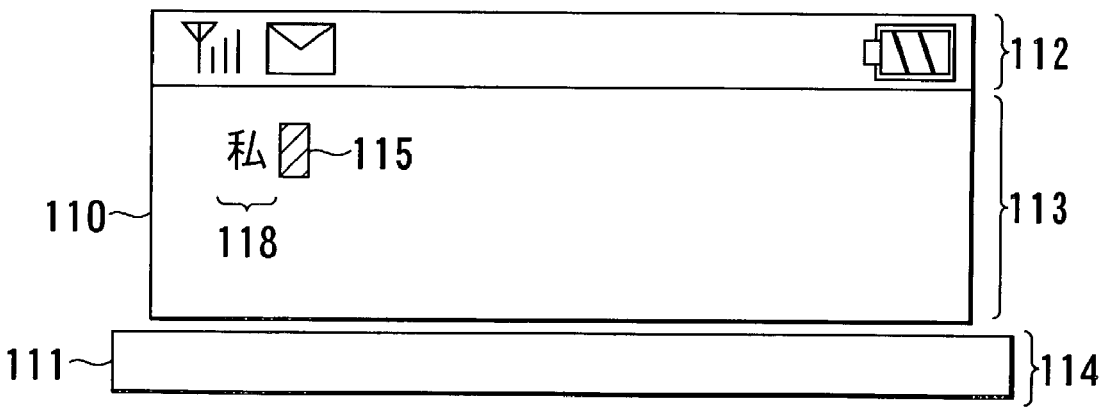

When an arbitrary conversion candidate character is selected among the conversion candidate characters 117 in the auxiliary mail drafting screen 111 according to operations of the operating section 5, the telephone control section 16 moves the selected conversion candidate character 118 to the position of the cursor 115 in the mail text display region 113 in the mail drafting screen 110, and the telephone control section 16 makes the expanded display section 13 display the moved conversion candidate character 118 there as shown in FIG. 13C.

Figure 14A:
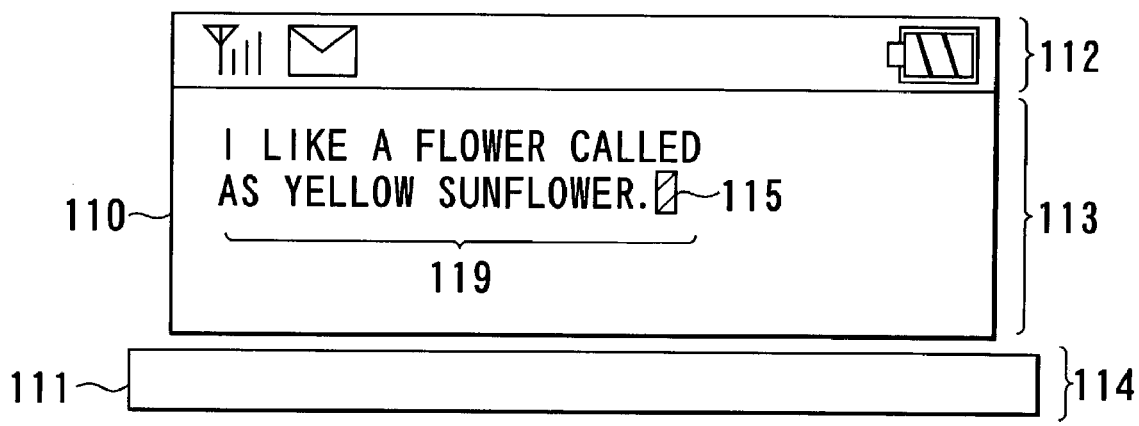
FIGS. 14A, 14B and 14C are schematic diagrams showing states of character shifting in a screen image displaying a display image and an auxiliary display image upon drafting mail text in a combined display mode.

In such a way, the telephone control section 16 is made to be capable of drafting an outgoing mail text 119 in the mail text display region 113 in the mail drafting screen 110 as shown in FIG. 14A by using both of the expansion display section 13 and the main body display section 8.

Figure 14B:
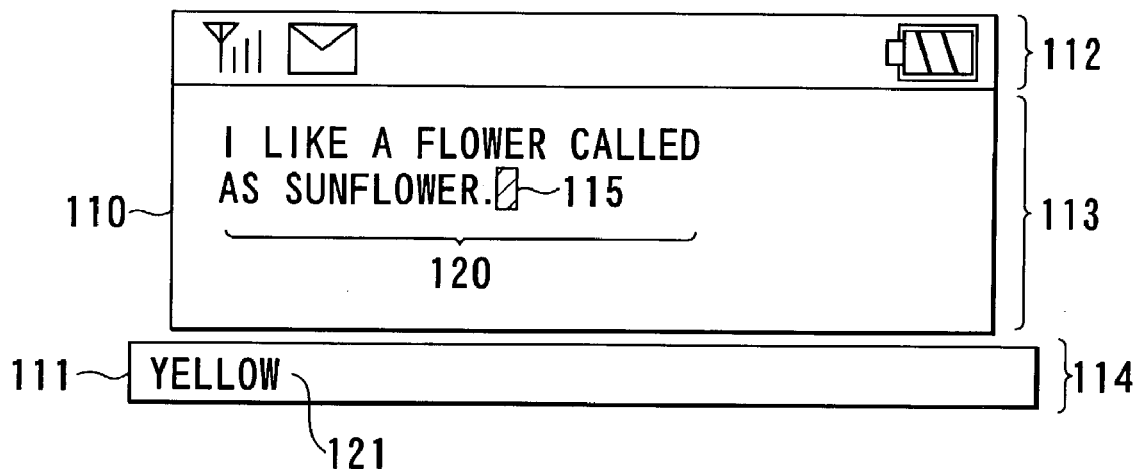

Now, the telephone control section 16 moves the cursor 115 on the mail drafting screen 110 according to operations of the operating section 5. And, when arbitrary insertion position alteration characters 121 are selected for alteration of an insertion position in the outgoing mail text 119, the telephone control section 16 extracts the insertion position alteration characters 121 from the outgoing mail text 119 in the mail text display region 113 as shown in FIG. 14B. Then, the telephone control section 16 makes the main body display section 8 display the extracted insertion position alteration characters 121 in the undetermined character display region 114 of the auxiliary mail drafting screen 111.

Figure 14C:
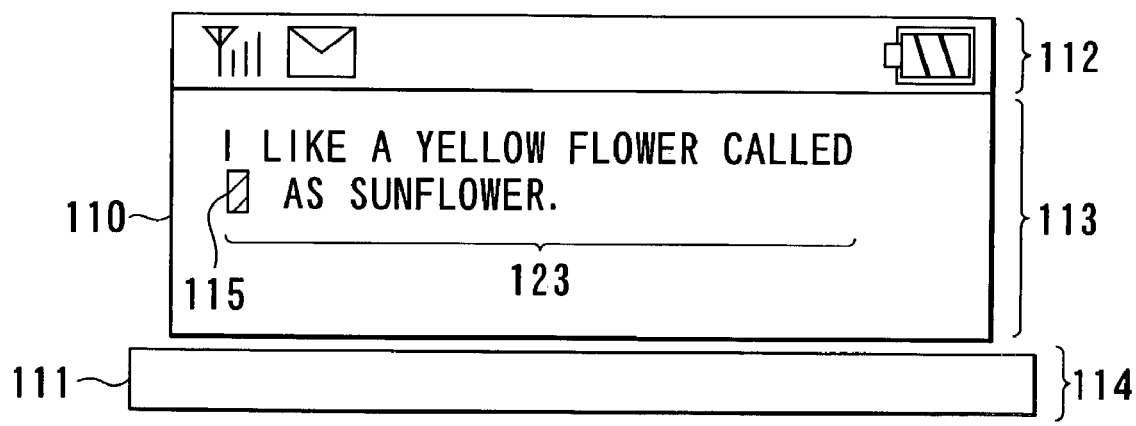

Then, the telephone control section 16 moves the cursor 115 on the mail drafting screen 110 according to operations of the operating section 5. And, when an insertion position for inserting the insertion position alteration characters 121 in the outgoing mail text 120 is newly designated, the telephone control section 16 moves the insertion position alteration characters 121 in the undetermined character display region 114 to the designated insertion position in the outgoing mail text 120 in the mail text display region 113 as shown in FIG. 14C, and makes the expansion display section 13 display the insertion position alteration characters 121 there.

In such a way, the telephone control section 16 is made to be also capable of editing an outgoing mail text of the combinedly displaying display mode while drafting the outgoing mail text.

Incidentally, when the telephone control section 16 makes a camera 27 image an object on the basis of an imaging command input through the operating section 5 in an imaging mode, the telephone control section 16 takes imaging data D26 obtained as a result of the imaging through the imaging control section 17, and at that occasion the telephone control section 16 generates imaging information data D27 indicating an imaging date, an imaging time and the like.

At this time, if the expansion display unit 10 is attached to the mobile telephone 1 in the state in which the solely displaying display mode has been set, the telephone control section 16 generates imaging image display screen data D28 on the basis of the imaging data D26 and the imaging information data D27, and sends the generated imaging image display screen data D28 to the expansion display section 13 through the expansion slot controlling section 18, the expansion slot 9, the expansion stick 11 and the expansion display unit control section 26 in order. Thereby, the telephone control section 16 makes the expansion display section 13 display the imaged image, imaging date and time information and the like on the basis of the imaging image display screen data D28.

Moreover, if the expansion display unit 10 is attached to the mobile telephone 1 in the state in which the combinedly displaying display mode has been set, the telephone control section 16 generates imaging image display screen data D29 on the basis of the imaging data D26, and sends the generated imaging image display screen data D29 to the expansion display section 13 through the expansion slot control section 18, the expansion slot 9, the expansion stick 11 and the expansion display unit control section 26 in order. Thereby, the telephone control section 16 makes the expansion display section 13 display an imaged image based on the imaging image display screen data D29. In addition, the telephone control section 16 generates imaging information display screen data D30 on the basis of the imaging information data D27, and sends the generated imaging information display screen data D30 to the main body display section 8. Thereby, the telephone control section 16 makes the main body display section 8 display the imaging date and time information, and the like based on the imaging information display screen data D30.

Figure 15:
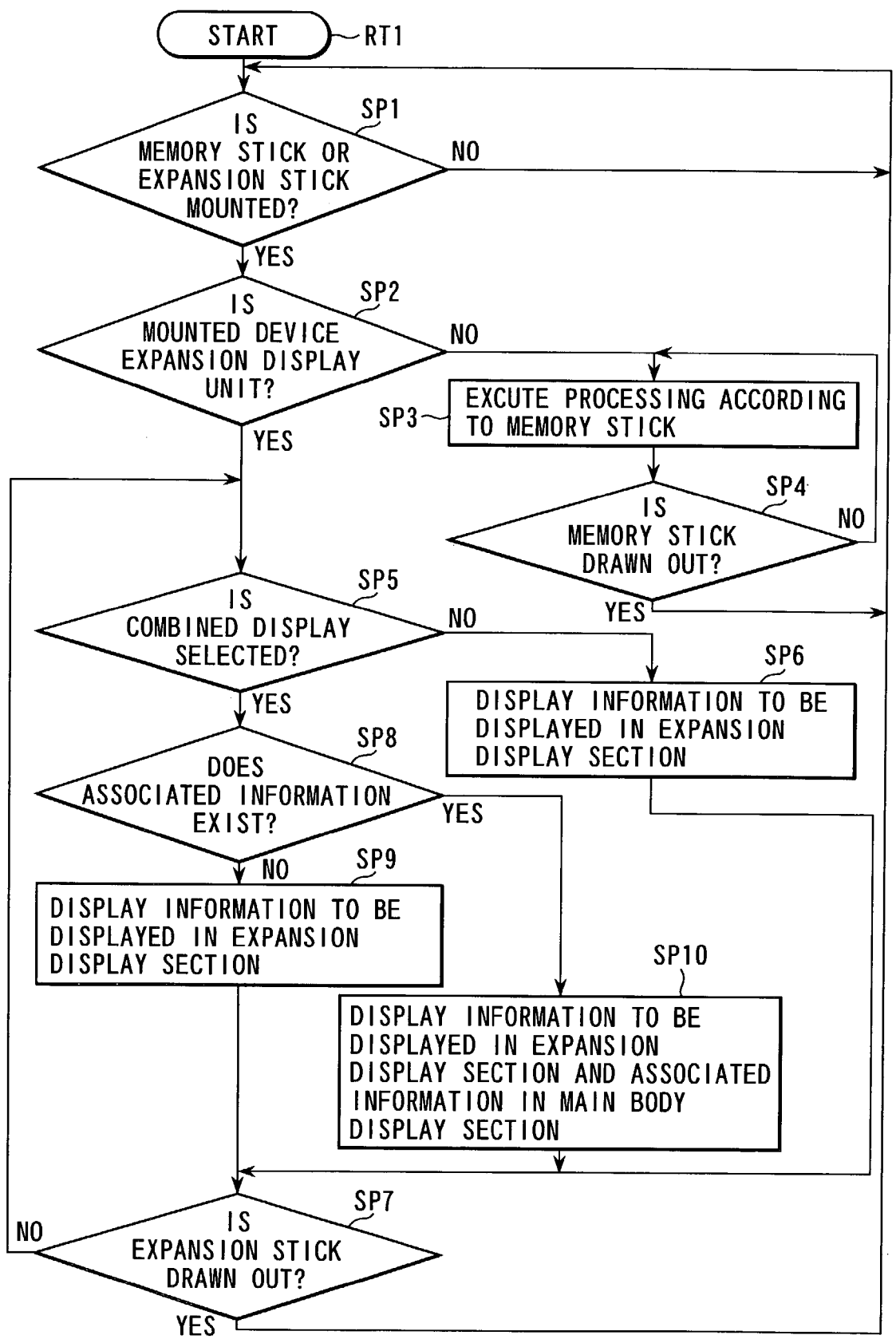
FIG. 15 is a flow chart showing a display control processing procedure of the mobile telephone.

Here, in practice, the telephone control section 16 of the mobile telephone 1 operates in accordance with a display control program expanded on the RAM 23 as shown in FIG. 15. That is, the processing of the telephone control section 16 enters from the start step of a display control processing procedure RT1 in FIG. 5, and proceeds to Step SP1. At Step SP1, the telephone control section 16 waits the attachment of the memory stick or the expansion stick 11 by insertion into the expansion slot 9 of the mobile telephone 1. When the memory stick or the expansion stick 11 is attached by insertion into the expansion slot 9, the telephone control section 16 reads the identification data D5 from the memory stick or the expansion stick 11, and the processing of the telephone control section 16 proceeds to Step SP2.

At Step SP2, the telephone control section 16 recognizes the thing attached to the mobile telephone 1 through the expansion slot 9 on the basis of the identification data D5, and judges whether the recognized thing is the expansion display unit 10 or not.

If a negative result is obtained at Step SP2, this result means that a memory stick or an expansion stick of external equipment other than the expansion display unit 10 has been attached by insertion into the expansion slot 9. In this case, the processing of the telephone control section 16 proceeds to Step SP3.

At Step SP3, the telephone control section 16 executes various pieces of processing according to the memory stick or the expansion stick of the other external equipment attached to the expansion slot 9 by insertion thereto. Then, the processing of the telephone control section 16 proceeds to Step SP4.

At Step SP4, the telephone control section 16 judges whether the memory stick or the expansion stick of the external equipment attached to the expansion slot 9 by insertion thereto has been pulled out from the expansion slot 9 or not. If the memory stick or the expansion stick of the external equipment has not been pulled out from the expansion slot 9 and the telephone control section 16 obtains a negative result, the processing of the telephone control section 16 returns to Step SP3.

On the contrary, at Step SP4, if the memory stick or the expansion stick of the external equipment has been pulled out from the expansion slot 9 and the telephone control section 16 obtains a positive result, the processing of the telephone control section 16 returns to Step SP1.

If a positive result is obtained at Step SP2, this result indicates that the expansion stick 11 of the expansion display unit 10 has been attached to the expansion slot 9 by insertion thereto, and the processing of the telephone control section 16 proceeds to Step SP5 in this case.

At Step SP5, the telephone control section 16 judges whether the combinedly displaying display mode has been selected or not.

If a negative result is obtained at Step SP5, this result indicates that the solely displaying display mode has been selected. In this case, the processing of the telephone control section 16 proceeds to Step SP6.

At Step SP6, the telephone control section 16 stops displaying of the main body display section 8, and sends the data of the information to be displayed D7 or the display information data D8 to the expansion display section 13. Thereby, the telephone control section 16 makes the expansion display section 13 display the information to be displayed based on the data of information to be displayed D7 or the information to be displayed and the associated information based on the display information data D8, and then the processing of the telephone control section 16 proceeds to next Step SP7.

On the contrary, if a positive result is obtained at Step SP5, this result indicates that combinedly displaying display mode has been selected. In this case, the processing of the telephone control section 16 proceeds to Step SP8.

At Step SP8, the telephone control section 16 judges whether the information to be displayed is accompanied by any associated information or not.

If a negative result is obtained at Step SP8, the result indicates that the information to be displayed is not accompanied by any associated information. In this case, the processing of the telephone control section 16 proceeds to Step SP9.

At Step SP9, the telephone control section 16 sends the data of the information to be displayed D7 to the expansion display section 13, and thereby the telephone control section 16 makes the expansion display section 13 display the information to be displayed. Then, the processing of the telephone control section 16 proceeds to Step SP7.

On the contrary, if a positive result is obtained at Step SP8, this result indicates that the information to be displayed is accompanied by the associated information. In this case, the processing of the telephone control section 16 proceeds to Step SP10.

At Step SP10, the telephone control section 16 sends the data of the information to be displayed D7 to the expansion display section 13, and thereby the telephone control section 16 makes the expansion display section 13 display the information to be displayed therein. Furthermore, the telephone control section 16 sends the associated information data D9 to the main body display section 8, and thereby the telephone control section 16 makes the main body display section 8 display the associated information therein. Then, the processing of the telephone control section 16 proceeds to next Step SP7.

At Step SP7, the telephone control section 16 judges whether the expansion stick 11 has been pulled out from the expansion slot 9 or not.

If a negative result is obtained at Step SP7, this result indicates that the expansion stick 11 of the expansion display control section 10 is being attached to the expansion slot 9 by insertion thereinto. In this case, the processing of the telephone control section 16 returns to Step SP5.

On the contrary, if a positive result is obtained at Step SP7, this result indicates that the expansion stick 11 of the expansion display unit 10 has been pulled out from the expansions lot 9. In this case, the processing of the telephone control section 16 returns to Step SP1, and repeats the above-mentioned processing.

Figure 16:
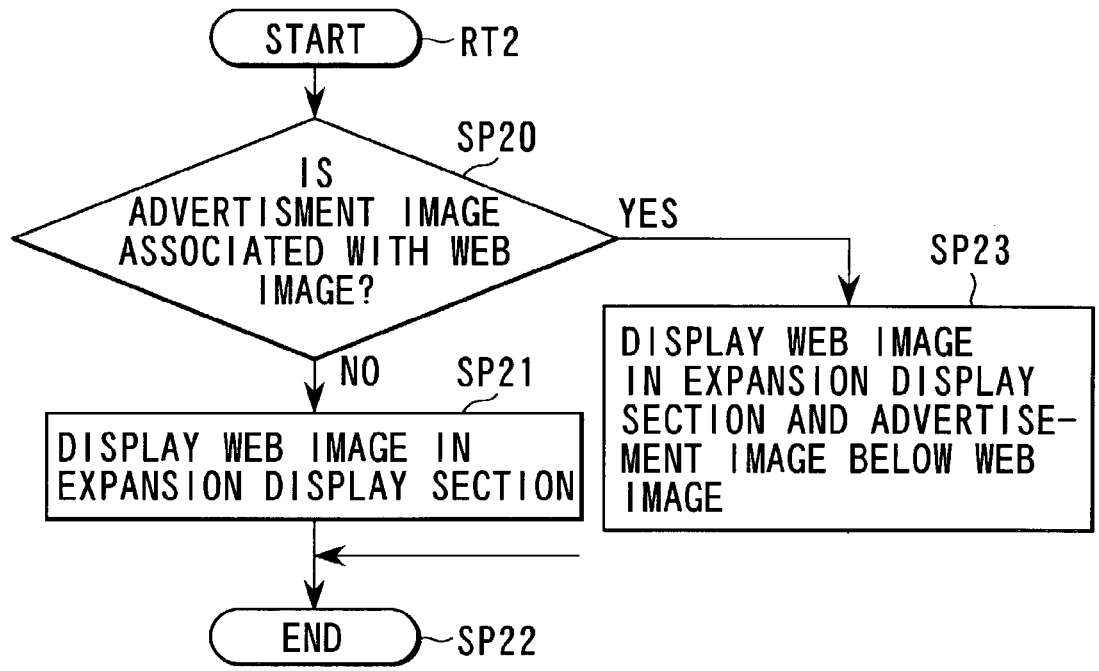
FIG. 16 is a flow chart showing a web image display processing procedure in a sole display mode.

Now, if the solely displaying display mode has been selected in a web image display mode, the telephone control section 16 starts the processing of a solely displayed web image display processing procedure RT2 shown in FIG. 16 in accordance with a display control program expanded on the RAM 23 as processing corresponding to Step SP6 in the display control processing procedure RT1 described above with reference to FIG. 15. The processing of the telephone control section 16 enters into the processing of the solely displayed web image display processing procedure RT2 from the start step thereof, and proceeds to Step SP20. Then, at Step SP20, the telephone control section 16 judges whether the web image data D10 is accompanied by the advertisement image data D11 or not.

If a negative result is obtained at Step SP20, the result indicates that the web image obtained by the mobile telephone 1 is not accompanied by any advertisement image. In this case, the processing of the telephone control section 16 proceeds to Step SP21.

At Step SP21, the telephone control section 16 makes the expansion display section 13 display the web images 33, and the processing of the telephone control section 16 proceeds to next Step SP22.

On the contrary, if a positive result is obtained at Step SP20, this result indicates that the web image obtained by the mobile telephone 1 is accompanied by an advertisement image. In this case, the processing of the telephone control section 16 proceeds to Step SP23.

At Step SP23, the telephone control section 16 makes the expansion display section 13 display the web images 43 and the advertisement image 44, and the processing of the telephone control section 16 proceeds to next Step SP22. At Step SP22, the telephone control section 16 ends the web image display processing procedure RT2 in the solely displaying display mode.

Figure 17:
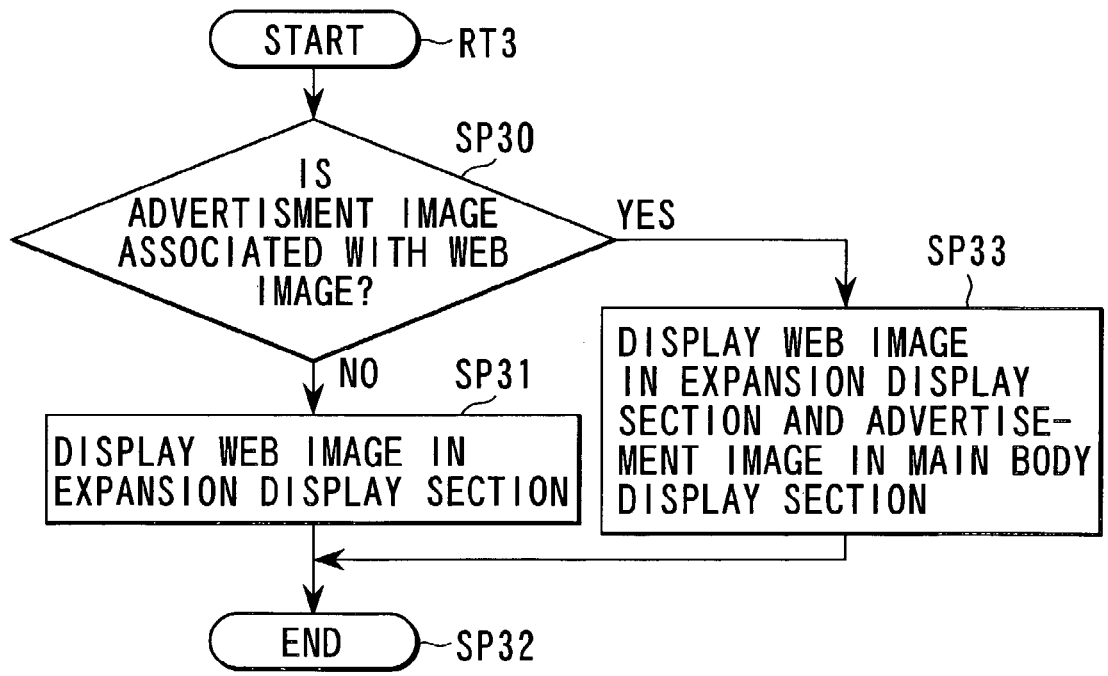
FIG. 17 is a flow chart showing a web image display processing procedure in a combined display mode.

Moreover, if the combinedly displaying display mode has been selected in the web image display mode, the telephone control section 16 starts the processing of a combinedly displayed web image display processing procedure RT3 shown in FIG. 17 in accordance with the display control program expanded on the RAM 23 as the processing corresponding to from Step SP8 to Step SP10 in the display control processing procedure RT1 described above with reference to FIG. 15. The processing of the telephone control section 16 enters into the processing of the combinedly displayed web image display processing procedure RT3 from the start step thereof, and proceeds to Step SP30. Then, at Step SP30, the telephone control section 16 judges whether the web image data D10 is accompanied by the advertisement image data D11 or not.

If a negative result is obtained at Step SP30, the result indicates that the web image obtained by the telephone control section 16 is not accompanied by any advertisement image. In this case, the processing of the telephone control section 16 proceeds to Step SP31.

At Step SP31, the telephone control section 16 makes the expansion display section 13 display the web images 53, and the processing of the telephone control section 16 proceeds to next Step SP32.

On the contrary, if a positive result is obtained at Step SP30, this result indicates that the web image obtained by the telephone control section 16 is accompanied by an advertisement image. In this case, the processing of the telephone control section 16 proceeds to Step SP33.

At Step SP33, the telephone control section 16 makes the expansion display section 13 display the web images 65, and makes the main body display section 8 display the advertisement image 66. Then, the processing of the telephone control section 16 proceeds to next Step SP32. At Step SP32, the telephone control section 16 ends the web image display processing procedure RT3 in the combinedly displaying display mode.

Figure 18:
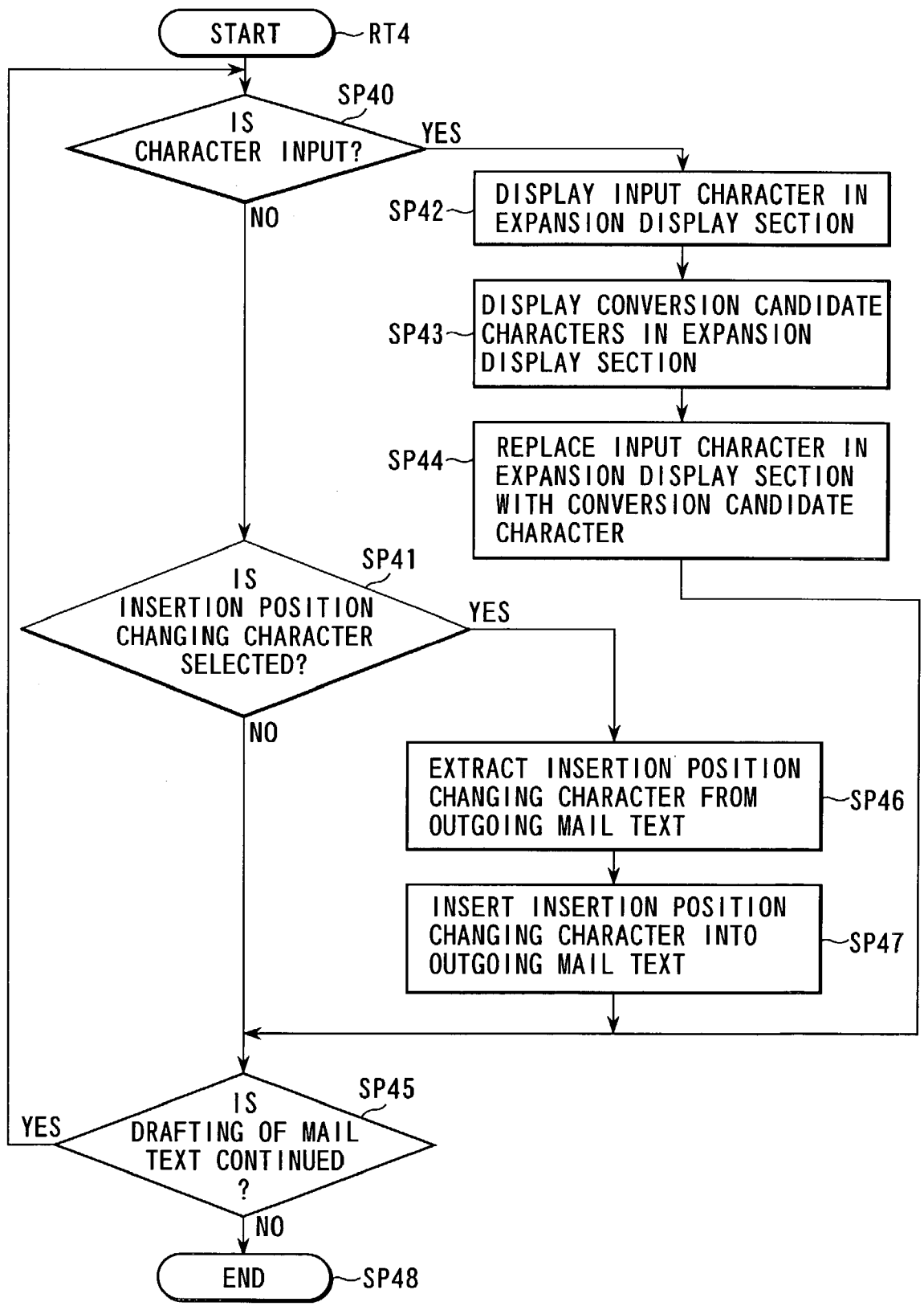
FIG. 18 is a flow chart showing a mail drafting screen display processing procedure in a sole display mode.

On the other hand, when an E-mail drafting command is entered into the telephone control section 16 through the operating system 5 in the state in which the solely displaying display mode has been selected, the telephone control section 16 starts the processing of a solely displayed mail drafting screen display processing procedure RT4 shown in FIG. 18 in accordance with a display control program expanded on the RAM 23 as the processing corresponding to Step SP6 in the display control processing procedure RT1 described above with reference to FIG. 15. The processing of the telephone control section 16 enters into the processing of the solely displayed mail drafting screen display processing procedure RT4 from the start step thereof, and proceeds to Step SP40. Then, at Step SP40, the telephone control section 16 judges whether an input character has been entered into the telephone control section 16 through the operating section 5 or not.

If a positive result is obtained at Step SP40, this result indicates that the input character has been entered through the operating section 5 into the telephone control section 16. In this case, the processing of the telephone control section 16 proceeds to Step SP42.

At Step SP42, the telephone control section 16 makes the expansion display section 13 display the input characters 94, and the processing of the telephone control section 16 proceeds to next Step SP43.

At Step SP43, when a conversion command of the input characters 94 is entered into the telephone control section 16 through the operating section 5, the telephone control section 16 makes the expansion display section 13 display a plurality of conversion candidate characters 96 in the conversion candidate display frame 95 in the mail text display region 92 in the mail drafting screen 90. Then, the processing of the telephone control section 16 proceeds to next Step SP44.

At Step SP44, when an arbitrary conversion candidate character among the conversion candidate characters 96 is selected according to operations of the operating section 5, the telephone control section 16 replaces the mail input characters 94 with the selected conversion candidate character 97 in the mail text display region 92 of the mail drafting screen 90. Then, the processing of the telephone control section 16 proceeds to Step SP45.

Now, if a negative result is obtained at Step SP40, the result indicates that a command other than an input character has been entered through the operating system 5. In this case, the processing of the telephone control section 16 proceeds to Step SP41.

At Step SP41, the telephone control section 16 judges whether an insertion position alteration character has been selected in the outgoing mail text 98 in the mail drafting screen 90 through the operating section 5 or not.

If a negative result is obtained at Step SP41, the result indicates that some command other than input characters and the selection of the insertion position alteration characters has been entered through the operating section 5. In this case, the processing of the telephone control section 16 proceeds to Step SP45.

On the contrary, if a positive result is obtained at Step SP41, this result indicates that insertion position alteration characters have been selected in the outgoing mail text 98 through the operating section 5. In this case, the processing of the telephone control section 16 proceeds to next Step SP46.

At Step SP46, the telephone control section 16 extracts the insertion position alteration characters from the outgoing mail text 99 in the mail drafting screen 90, and makes the expansion display section 13 display the extracted insertion position alteration characters 101 in the insertion position alteration character display frame 100 in the mail text display region 92. Then, the processing of the telephone control section 16 proceeds to next Step SP47.

At Step SP47, when an insertion position is designated in the outgoing mail text 99 on the mail drafting screen 90 through the operating section 5, the telephone control section 16 inserts the insertion position alteration characters 101 at the designated insertion position in the text of the outgoing mail 99, and then the processing of the telephone control section 16 proceeds to next Step SP 45.

At Step SP45, the telephone control section 16 judges whether the drafting of the E-mail should be continued or not.

If a positive result is obtained at Step SP45, the result indicates that no ending command of the drafting of the E-mail has been entered through the operating section 5 yet. In this case, the processing of the telephone control section 16 returns to Step SP40, and the telephone control section 16 repeats the above-mentioned processing.

On the contrary, if a negative result is obtained at Step SP45, the result indicates that an ending command of the drafting of the E-mail has been entered through the operating section 5. In this case, the processing of the telephone control section 16 proceeds to Step SP48, and the telephone control section 16 ends the solely displayed mail display screen display processing procedure RT4.

Figure 19:
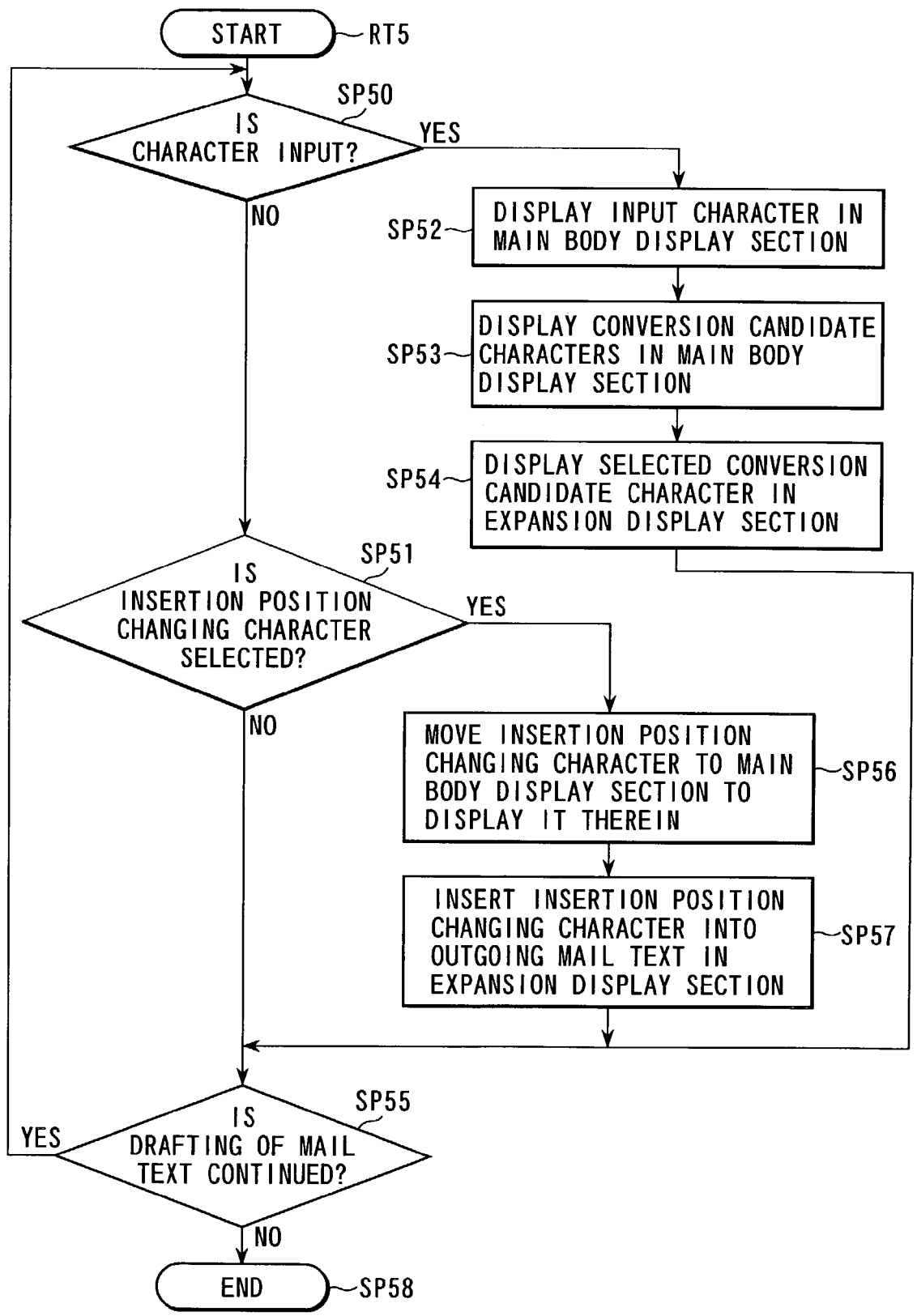
FIG. 19 is a flow chart showing a mail drafting screen display processing procedure in a combined display mode.

Moreover, when an mail drafting command is entered through the operating station 5 in the state in which the combinedly displaying display mode has been selected, the telephone control section 16 starts the processing of a combinedly displayed mail drafting screen display processing procedure RT5 shown in FIG. 19 in accordance with a display control program expanded on the RAM 23 as the processing corresponding to from Step SP8 to Step SP10 in the display control processing procedure RT1 described above with reference to FIG. 15. The processing of the telephone control section 16 enters into processing of the combinedly displayed mail drafting screen display processing procedure RT5 from the start step thereof, and proceeds to Step SP50. Then, at Step SP50, the telephone control section 16 judges whether an input character has been entered into the telephone control section 16 through the operating section 5 or not.

If a positive result is obtained at Step SP50, this result indicates that the input character has been entered through the operating section 5 into the telephone control section 16. In this case, the processing of the telephone control section 16 proceeds to Step SP52.

At Step SP52, the telephone control section 16 makes the main body display section 8 display the input characters 116, and the processing of the telephone control section 16 proceeds to next Step SP53.

At Step SP53, when a conversion command of the input characters 116 is entered into the telephone control section 16 through the operating section 5, the telephone control section 16 makes the main body display section 8 display a plurality of conversion candidate characters 117 in place of the input characters 116. Then, the processing of the telephone control section 16 proceeds to next Step SP54.

At Step SP54, when an arbitrary conversion candidate character among the conversion candidate characters 117 is selected through the operating section 5, the telephone control section 16 makes the expansion display section 13 display the selected conversion candidate character 118. Then, the processing of the telephone control section 16 proceeds to Step SP55.

Now, if a negative result is obtained at Step SP50, the result indicates that various commands other than an input character have been entered through the operating system 5. In this case, the processing of the telephone control section 16 proceeds to Step SP51.

At Step SP51, the telephone control section 16 judges whether insertion position alteration characters have been selected in the outgoing mail text 119 in the mail drafting screen 110 displayed in the expansion display section 13 or not.

If a negative result is obtained at Step SP51, the result indicates that some command other than input characters and the selection of the insertion position alteration characters has been entered through the operating section 5. In this case, the processing of the telephone control section 16 proceeds to Step SP55.

On the contrary, if a positive result is obtained at Step SP51, this result indicates that insertion position alteration characters have been selected in the outgoing mail text 119 through the operating section 5. In this case, the processing of the telephone control section 16 proceeds to next Step SP56.

At Step SP56, the telephone control section 16 makes the expansion display section 13 display the outgoing mail text 120 from which the insertion position alteration characters 121 have been extracted in the mail drafting screen 110. In addition, the telephone control section 16 makes the main body display section 8 display the extracted insertion position alteration characters 121. Then, the processing of the telephone control section 16 proceeds to next Step SP57.

At Step SP57, when an insertion position is designated in the outgoing mail text 120 on the mail drafting screen 110 through the operating section 5, the telephone control section 16 moves and inserts the insertion position alteration characters 121 displayed in the main body display section 8 to the designated insertion position in the text of the outgoing mail in the mail drafting screen 110, and then the processing of the telephone control section 16 proceeds to next Step SP55.

At Step SP55, the telephone control section 16 judges whether the drafting of the E-mail should be continued or not.

If a positive result is obtained at Step SP55, the result indicates that no ending command of the drafting of the E-mail has been entered through the operating section 5 yet. In this case, the processing of the telephone control section 16 returns to Step SP50, and the telephone control section 16 repeats the above-mentioned processing.

On the contrary, if a negative result is obtained at Step SP55, the result indicates that an ending command of the drafting of the E-mail has been entered through the operating section 5. In this case, the processing of the telephone control section 16 proceeds to Step SP58, and the telephone control section 16 ends the combinedly displayed mail display screen display processing procedure RT5.

In the above-mentioned configuration, the mobile telephone 1 attaches the expansion stick 11 of the expansion display unit 10 to the expansion slot 9 in the state capable of taking out and putting in to the expansion slot 9 freely. The expansion stick 11 is provided with the expansion display section 13 having a display surface larger than that of the main body display section 8.

And, when information to be displayed is not accompanied by any associated information in the case where the expansion display unit 10 is attached to the mobile telephone 1, the mobile telephone 1 makes the expansion display unit 10 display the information to be displayed in the expansion display section 13 of the expansion display unit 10. When information to be displayed is accompanied by associated information, the mobile telephone 1 separates the information to be displayed from the associated information, and makes the expansion display unit 10 display the separated information to be displayed in the expansion display section 13 of the expansion display unit 10. In addition, the mobile telephone 1 makes the main body display section 8 displays the separated associated information therein.

Consequently, because the mobile telephone 1 makes the expansion display section 13, which has a display surface larger than that of the main body display section 8, display the information to be displayed therein, the part of the contents of the information to be displayed which can collectively be shown is remarkably increased to enable a user to confirm the contents of the information to be displayed easily.

Moreover, because the display surface of the expansion display section 13 is larger than that of the main body display section 8, the part of the information to be displayed which cannot be displayed in the expansion display section 13 is remarkably less than the part of the information which could not be displayed in the main body display section 8. Consequently, the mobile telephone 1 makes it possible to decrease operations for showing the part of the information to be displayed which cannot be displayed such as a scroll operation and the like remarkably.

Moreover, by removing the expansion display unit 10 from the mobile telephone 1 in the case where the mobile telephone 1 is carried, the portability of the mobile telephone 1 cannot be damaged.

In addition, because the mobile telephone 1 separates the information to be displayed from the associated information to display them separately into the expansion display section 13 and the main body display section 8, respectively, the visibilities of the contents of the information to be displayed and the associated information can be improved individually.

Moreover, if the web image 64 is accompanied by the advertisement image 66, the mobile telephone 1 makes the expansion display section 13 display the web image 64 therein, and makes the main body display section 8 display the advertisement image 66 therein. Consequently, the advertisement image 66 is displayed in the main body display section 8 which is not used ordinarily in case of viewing of only the web image 64. Hence, the display sections can effectively be used.

Moreover, because the mobile telephone 1 makes the expansion display section 13 display an outgoing mail text therein, and further makes the main body display section 8 display input characters therein at the time of drafting mail, the mobile telephone 1 can enable a user to input the characters while confirming the contents of the outgoing mail text easily and suitably.

Incidentally, because the mobile telephone 1 also makes the main body display section 8 display a plurality of conversion candidate characters 117 therein, the mobile telephone 1 can enable a user to select a desired conversion candidate character while confirming the contents of an outgoing mail text easily and suitably.

In addition to this, the mobile telephone 1 executes insertion processing of insertion position alteration characters 121 by the use of both of the expansion display section 13 and the main body display section 8, the mobile telephone 1 enables a user to perform movement processing of the insertion position alteration characters 121 easily while viewing styles and appearances of an outgoing mail text before and after the extraction of the characters 121 and at the time of the insertion of the characters 121 by means of the display of the mail text 149 in the expansion display section 13 having a display surface larger than that of the main body display section 8 and by means of the display of the characters 121 in the main body display section 8.

According to the above-mentioned configuration, the expansion slot 9 for an external memory such as memory stick is employed as an expansion slot, but other functional slot such as an USB slot, a modem connecting slot, or the like that is provided to the mobile phone 1 is used by considering compatibility with existed such slot.

According to the above-mentioned configuration, the mobile telephone 1 is configured to make it possible to attach the expansion stick 11 of the expansion display unit 10 by insertion into the expansion slot 9 in the state in which the expansion stick 11 can freely be taken out and put in. The expansion display unit 10 is provided with the expansion display section 13 having a display surface larger than that of the main body display section 8. The mobile telephone 1 is also configured to make the expansion display section 13 display information to be displayed therein. Thereby, the mobile telephone 1 can remarkably increase the part of the contents of information to be displayed which can be shown collectively, and consequently the mobile telephone 1 enables a user to confirm the contents of the information to be displayed easily. Thus, the usability of the mobile telephone can exceptionally be improved.

Figure 20:
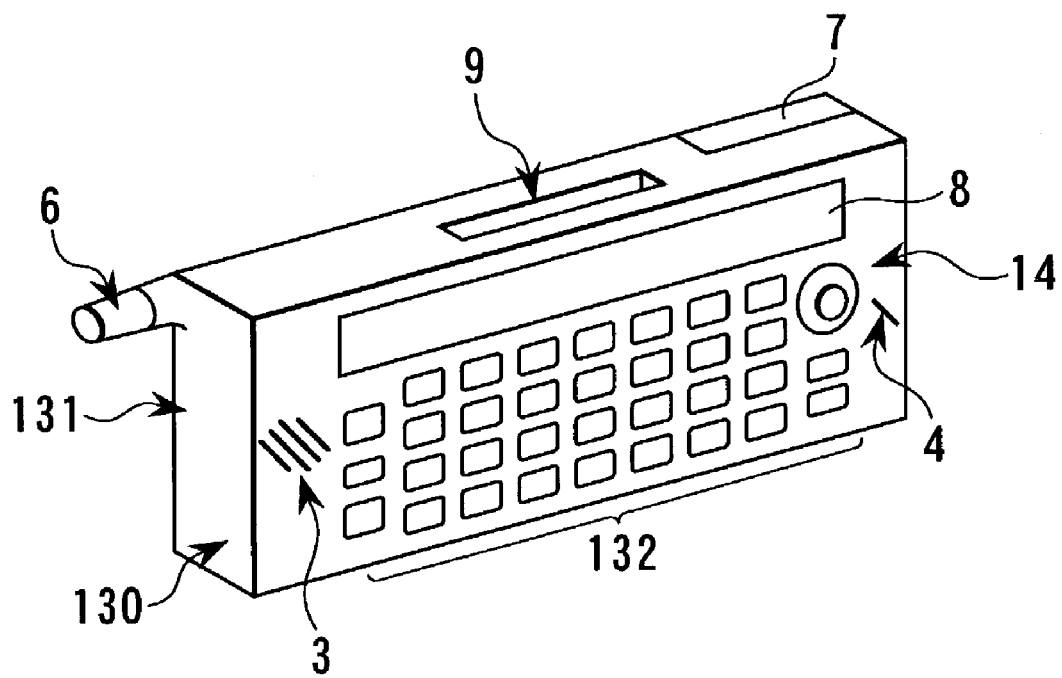
FIG. 20 is a schematic perspective view showing the configuration of a mobile telephone according to another embodiment.

Incidentally, in the above-described embodiment, as described above with reference to FIG. 1, is described the case where the operating section 5 composed of various operation keys for realizing the function of a speech basically is provided at the front of the main body housing 2 of the mobile telephone 1. However, the present invention is not limited to such a case. Operation sections composed of other operation key configurations may be provided as long as various commands to input characters can be input. For example, as shown in FIG. 20, in which components corresponding to those in FIG. 1 are designated by the same reference numerals as those in FIG. 1, an operating section 132 composed of various operation keys similar to a keyboard for a personal computer may be provided at the front of a main body housing 131 of a mobile telephone 130 in proportion to the formation of the main body display section 8 to be slender.

Moreover, in the above-described embodiments, the case where the expansion slot 9 is formed on the main body housing 2 is described. As it is apparent from FIGS. 2 and 3, the expansion stick 11 is attached to the expansion slot 9 by insertion thereinto in the manner capable of being freely taken out and put in, in the state in which the longer direction of the expansion stick 11 is same as the longer direction of the main body housing 2. However, the present invention is not limited to such a case. An expansion slot into which an expansion stick is attached by insertion in the manner capable of being freely taken out and put in, in the state in which the longer direction of the expansion stick is substantially perpendicular to the longer direction of the main body housing 2, may be formed on the main body housing 2. Other various expansion slots may also be formed at various positions or faces on the main body housing 2 as long as they can attach expansion sticks by insertion in the manner capable of taking out and putting in.

Figure 21:
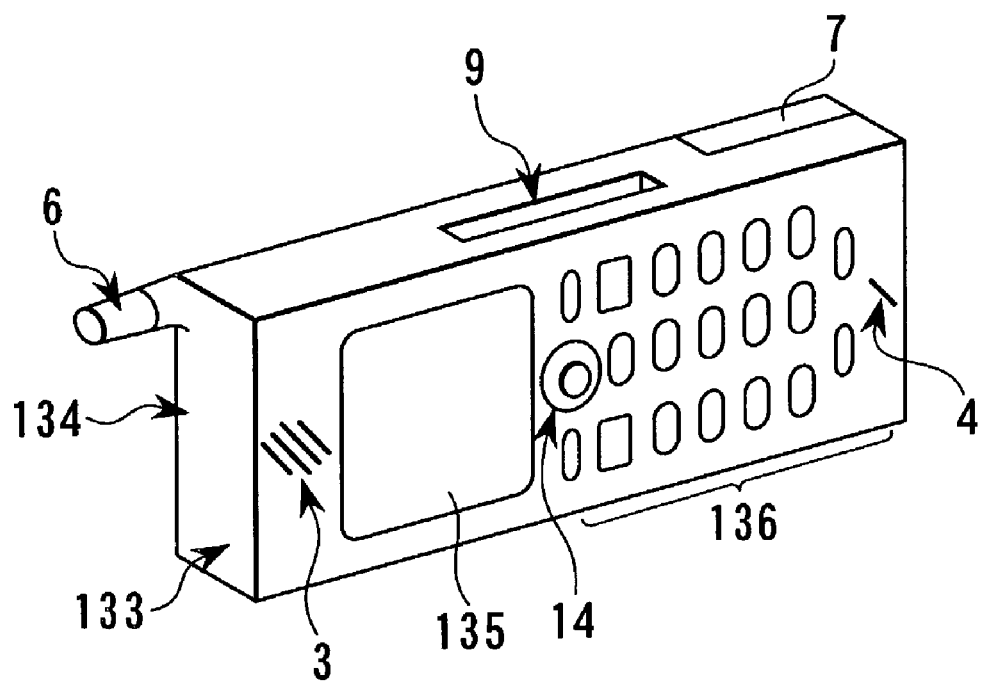
FIG. 21 is a schematic perspective view showing the configuration of a mobile telephone according to further embodiment.

Moreover, in the above-described first embodiment is described the case where the main body display section 8 for display characters and the like in a row, which is described with reference to FIG. 1, is adopted as the main body display section having a main body display surface of a predetermined size. However, the present invention is not limited to such a case. Other main body display sections in various shapes may be adopted at various positions of the other main body housings. For example, as shown in FIG. 21, in which the components corresponding to those shown in FIG. 1 are designated by the same reference numerals as those in FIG. 1, a square display section 135 capable of displaying a plurality of rows may be provided on a front left side of a main body housing 134 of a mobile telephone 133. Otherwise, a rectangular display section capable of displaying a few rows of character strings may be provided on the front upper end of a main body housing.

Moreover, in the above-described embodiments is described the case where the expansion display section 13 of the expansion display unit 10, which has been described above with reference to FIGS. 2 and 3, is adopted as an expansion display section having an expansion display surface larger than the main body display surface. However, the present invention is not limited to such a case. Other various expansion display sections such as one formed integrally with a main body housing may be adopted as long as they have expansion display surfaces larger than main body display surfaces.

Moreover, in the above-described embodiments is described the case where the expansion slot 9 compatible with the standards of the memory stick capable of being taken out and put in, which has been described above with referenced to FIGS. 2 and 3, is adopted as external memory connection means to which an external memory is attached by insertion in the manner capable of being freely taken out and put in, and to which an expansion display section having an expansion display surface larger than the main body display surface is detachably connected in place of the external memory. However, the present invention is not limited to such a case. The present invention may adopt other various external memory connection means, such as ones compatible with standards different from the standards of the memory stick or the like, as long as they are ones to which an external memory is attached by insertion in the manner capable of being freely taken out and put in, and to which an expansion display section having an expansion display surface larger than the main body display surface is detachably connected in place of the external memory.

Moreover, in the above-described embodiments is described the case where the expansion slot control section 18 detecting the attachment by insertion of the expansion display section to the external memory connection means by the electric conduction of the detection terminal in the inside of the expansion stick 11 described above with reference to FIG. 4 is adopted as detection means for detecting the attachment by insertion of the expansion display section to the external memory connection means. However, the present invention is not limited to such a case. The present invention can widely adopt other various detection means such as ones using a switch or the like for mechanically detecting the attachment of the expansion stick by insertion into the expansion slot as long as they can detect the attachment of the expansion display section by insertion into the external memory connection means.

Moreover, in the above-described embodiments is described the case where the telephone control section 16 of the mobile telephone 1 described above with reference to FIGS. 4–19 is adopted as display control means for making the main body display section display information to be displayed before the expansion display section is attached to the external memory connection means by insertion thereto and for making the expansion display section display the information to be displayed after the expansion display section has been attached to the external memory connection means by insertion thereto. However, the present invention is not limited to such a case. The present invention can widely adopt other various display control means such as a central processing unit (CPU), a microprocessor and the like as long as they can make the main body display section display the information to be displayed before the expansion display section is attached to the external memory connection means by insertion thereto, and can make the expansion display section display the information to be displayed after the expansion display section has been attached to the external memory connection means by insertion thereto.

Moreover, in the above-described embodiments is described the case where the present invention adopts information to be displayed and associated information accompanying the information to be displayed as information to be displayed as follows. That is, a web image and the advertisement image 66 accompanying the web image; an incoming mail text and incoming mail information accompanying the incoming mail text; an outgoing mail text, and an input character and an insertion position altering character, both accompanying the outgoing mail text; and an imaged image and imaging date and hour information accompanying the imaged image are adopted as the information to be displayed and the associated information accompanying the information to be displayed, respectively. However, the present invention is not limited to such a case. The present invention can widely adopt various pieces of information to be displayed and associated information. For example, the present invention can adopt screen images of a movie as the information to be displayed, and profiles of actors and actresses appearing in the movie, subtitles and the like as the associated information accompanying the information to be displayed.

Moreover, in the above-described embodiments is described the case where the telephone control section 16 is adopted as separation means for separating associated information from information to be displayed. However, the present invention is not limited to such a case. The present invention can widely adopt other various separation means such as a CPU and a microprocessor as long as they can separate the associated information from the information to be displayed.

Moreover, in the afore-described embodiments is described the case where either of the solely displaying display mode and the combinedly displaying display mode is arbitrarily selected in advance as the display mode of the main body display section 8 and the expansion display section 13 before the attachment of the expansion display unit 10 to the mobile telephone 1. However, the present invention is not limited such a case. The present invention can also adopt the case where the solely displaying display mode and the combinedly displaying display mode are arbitrarily selected to be switched in the state in which the expansion display unit 10 is attached to the mobile telephone 1. Thereby, in the case where the information to be displayed, which is displayed on the expansion display unit, and the associated information can be displayed collectively even if the associated information is added to the information to be displayed, it becomes possible to stop using the main body display section by switching the display mode from the combinedly displaying display mode to the solely displaying display mode. Thereby, wasteful power consumption can surely be prevented.

Moreover, in the above-described embodiments is described the case where the telephone control section 16 executes a series of processing described above with reference to FIGS. 15–19 in accordance with the display control program stored in the ROM 22 previously. However, the present invention is not limited to such a case. The above-mentioned series of processing may be executed in accordance with a display control program stored in a program storage medium which is installed in the mobile telephone 1.

And, the program storage medium for installing the display control program for executing the above-mentioned series of processing into the mobile telephone 1 and for making the display control program be in the state capable of being executed may be realized by a semiconductor memory (external memory), a magnetic disk and the like for storing the program temporarily or permanently as well as package media such as a floppy (registered trade mark) disk, a compact disc-read only memory (CD-ROM), a digital versatile disc (DVD) and the like. Moreover, as means for storing the display control program into the program storing media, wired and wireless communication media such as a local area network, the Internet, a digital satellite broadcasting and the like may also be used. In such a case, the display control program may be stored through various interfaces such as a router, a modem and the like.

Moreover, in the above-described embodiments is described the case where the mobile telephones 1, 130 and 133, which have been described above with reference to FIGS. 1–21, are adopted as the mobile terminal apparatus according to the present invention. However, the present invention is not limited to such a case. The present invention can be applied to various mobile terminal apparatus such as a mobile telephone provided with a plurality of display sections different to each other, all being formed on a main body housing, and a personal digital assistant (PDA), a transceiver and the like that have at least one main body display section, and a slot capable of connecting the main body with an external memory in the case where only one main body display section is provided. In such a way, information to be displayed and associated information can separately be displayed in the expansion display section and the main body display section, respectively, and thus a user can confirm the contents of the information to be displayed and the associated information individually.

Moreover, in the above-described embodiment is described the case where the electric power of the expansion display unit 10 is supplied from the battery pack 7 of the mobile telephone 1. However, the present invention is not limited to such a case. A primary battery and/or a secondary battery detachable to the expansion display unit may also be provided. In such a way, both of the electric power of the expansion display unit and the electric power of the battery pack 7 of the mobile telephone 1 can be used collectively when the expansion display unit is attached to the mobile telephone 1. Consequently, the mobile telephone 1 and the expansion display unit can be operated for a long time when the expansion display unit is attached to the mobile telephone 1.

What is claimed is:

1. A mobile terminal apparatus comprising:
a main body display section having a main body display surface;
external memory connection means for attaching an external memory by insertion thereto so as to be freely taken out and put in and for detachably connecting an expansion display section thereto in place of said external memory, said expansion display section having an expansion display surface larger than said main body display surface;
display control means for controlling said main body display section to display information when said expansion display section is attached by insertion into said external memory connection means and for controlling said expansion display section to display said information after said expansion display section is attached by insertion into said external memory connection means;
detection means for detecting attachment of said expansion display section by insertion into said external memory connection means; and
separation means for separating associated information from said information to be displayed according to a detection result of said detection means when said information to be displayed is accompanied by said associated information,
whereby said display control means controls only said expansion display section to display said information according to said detection result of said detection means when said information to be displayed is not accompanied by said associated information, and controls said expansion display section to display said information and controls said main body display section to display said associated information according to said detection result of said detection means when said information to be displayed is accompanied by said associated information
wherein said separation means separates an undetermined input character as said associated information, upon entering said undetermined input character for drafting a sentence, from determined input characters as said information to be displayed, upon entering said determined input characters for drafting the sentence.

2. The mobile terminal according to claim 1, wherein said separation means separates an advertisement image as said associated information from an externally obtained image obtained externally as said information to be displayed.

3. A mobile terminal apparatus comprising:
a main body display section having a main body display surface;
external memory connection means for attaching an external memory by insertion thereto so as to be freely taken out and put in and for detachably connecting an expansion display section thereto in place of said external memory, said expansion display section having an expansion display surface larger than said main body display surface; and
display control means for controlling said main body display section to display information when said expansion display section is attached by insertion into said external memory connection means and for controlling said expansion display section to display said information after said expansion display section is attached by insertion into said external memory connection means
detection means for detecting attachment of said expansion display section by insertion into said external memory connection means; and
separation means for separating associated information from said information to be displayed according to a detection result of said detection means when said information to be displayed is accompanied by said associated information,
whereby said display control means controls only said expansion display section to display said information according to said detection result of said detection means when said information to be displayed is not accompanied by said associated information, and controls said expansion display section to display said information and controls said main body display section to display said associated information according to said detection result of said detection means when said information to be displayed is accompanied by said associated information,
wherein said separation means separates an insertion position alteration character as said associated information for altering an insertion position in a sentence for drafting said sentence as said information to be displayed.

4. A mobile terminal apparatus comprising:
a main body display section having main body display surface;
an expansion display section having an expansion display surface larger than said main body display surface;
separation means for separating associated information from information to be displayed when said information to be displayed is accompanied by said associated information; and
display control means for controlling said expansion display section to display said information to be displayed, and for controlling said main body display section to display said associated information when said information to be displayed is accompanied by said associated information,
wherein said separation means separates an undetermined input character as said associated information, upon entering said undetermined input character for drafting a sentence, from determined input characters as said information to be displayed, upon entering said determined input characters for drafting the sentence.

5. The mobile terminal apparatus according to claim 4, wherein said separation means separate an advertisement image as said associated information from an externally obtained image as said information to be displayed.

6. A mobile terminal apparatus comprising:
a main body display section having main body display surface;
an expansion display section having an expansion display surface larger than said main body display surface;
separation means for separating associated information from information to be displayed when said information to be displayed is accompanied by said associated information; and
display control means for controlling said expansion display section to display said information to be displayed, and for controlling said main body display section to display said associated information when said information to be displayed is accompanied by said associated information,
wherein said separation means separates an insertion position alteration character as said associated information for altering an insertion position in a sentence for drafting said sentence as said information to be displayed.

7. The A display control program,
for making a mobile terminal apparatus execute:
a separation step of separating associated information from information to be displayed when said information to be displayed is accompanied by said associated information; and
a display control step of controlling a expansion display section to display said information to be displayed, said expansion display section having an expansion display surface larger than a main body display surface of a main body display section of the mobile telephone apparatus, said main body display surface being a predetermined size, and of controlling said main body display section to display said associated information when said information to be displayed is accompanied by said associated information,
wherein, in said separation step, an insertion position alteration character as said associated information for altering an insertion position in a sentence for drafting said sentence as said information to be displayed.

8. A display control program storage medium for making a mobile terminal apparatus execute a display control program, said program comprising:
a separation step of separating associated information from information to be displayed when said information to be displayed is accompanied by said associated information; and
a display control step of controlling an expansion display section to display said information to be displayed, said expansion display section having an expansion display surface larger than a main body display surface of a main body display section of the mobile telephone apparatus, said main body display surface being a predetermined size, and of controlling said main body display section to display said associated information when said information to be displayed is accompanied by said associated information,
wherein, in said separation step, an undetermined input character as said associated information, upon entering said undetermined input character for drafting a sentence, is separated from determined input characters as said information to be displayed, upon entering said determined input characters for drafting the sentence.

9. The display control program storage medium according to claim 8, wherein, in said separation step, an advertisement image as said associated information is separated from an externally obtained image as said information to be displayed.

10. A display control program medium,
for making a mobile terminal apparatus execute a display control program, said program comprising:
a separation step of separating associated information from information to be displayed when said information to be displayed is accompanied by said associated information; and
a display control step of controlling an expansion display section to display said information to be displayed, said expansion display section having an expansion display surface larger than a main body display surface of a main body display section of the mobile telephone apparatus, said main body display surface being a predetermined size, and of controlling said main body display section to display said associated information when said information to be displayed is accompanied by said associated information,
wherein, in said separation step, an insertion position alteration character as said associated information for altering an insertion position in a sentence is separated from said sentence as said information to be displayed.

11. A mobile terminal comprising:
a main body display section having a main body display surface;
connection means for attaching an external connector by insertion thereto so as to be freely taken out and put in and arranged to accept an expansion display section in place of the external connector;
display control means for controlling said main body display section to display information, wherein
said display control means further controls said expansion display section to display at least a part of said display information when said expansion display section is attached by insertion into said connection means;
detection means for detecting attachment of said expansion display section to said connection means; and separation means for separating associated display information from said display information according to a detection result of said detection means when said information is accompanied by said associated display information, wherein said separation means separates an undetermined input character as said associated display information, upon entering of said undetermined input character for drafting a sentence, from determined input characters as said display information, upon entering of said determined input characters for drafting the sentence.

12. The mobile terminal according to claim 11, wherein said separation means separates an advertisement image as said associated information from an externally obtained image as said display information.

13. A mobile terminal apparatus, comprising:

a main body display section having a main body display surface;

connection means for attaching an external connector by insertion thereto so as to be freely taken out and put in and arranged to accept an expansion display section in place of the external connector; and display control means for controlling said main body display section to display information, wherein said display control means further controls said expansion display section to display at least a part of said display information when said expansion display section is attached by insertion into said connection means, and wherein said separation means separates an insertion position alteration character as said associated display information for altering an insertion position in a sentence from said sentence as said display information.

* * * * *